US010209900B2

(12) United States Patent
Goel et al.

(10) Patent No.: US 10,209,900 B2
(45) Date of Patent: *Feb. 19, 2019

(54) BUFFER ALLOCATION AND MEMORY MANAGEMENT USING MAPPING TABLE

(71) Applicant: Fungible Inc., Santa Clara, CA (US)

(72) Inventors: Deepak Goel, San Jose, CA (US); Wael Noureddine, Santa Clara, CA (US); Paul Kim, Fremont, CA (US)

(73) Assignee: Fungible, Inc., Santa Clara, CA (US)

( * ) Notice: Subject to any disclaimer, the term of this patent is extended or adjusted under 35 U.S.C. 154(b) by 142 days.

This patent is subject to a terminal disclaimer.

(21) Appl. No.: 15/347,547

(22) Filed: Nov. 9, 2016

(65) Prior Publication Data

US 2018/0081567 A1 Mar. 22, 2018

Related U.S. Application Data

(63) Continuation-in-part of application No. 15/269,457, filed on Sep. 19, 2016.

(51) Int. Cl.
*G06F 12/00* (2006.01)
*G06F 3/06* (2006.01)
*G06F 13/00* (2006.01)
*G06F 13/28* (2006.01)

(52) U.S. Cl.
CPC .......... *G06F 3/0613* (2013.01); *G06F 3/0656* (2013.01); *G06F 3/0673* (2013.01)

(58) Field of Classification Search
CPC .... G06F 3/0631; G06F 3/0604; G06F 3/0653; G06F 3/0685; G06F 12/1009; G06F 2212/1008; G06F 2212/1044; G06F 2212/65

See application file for complete search history.

(56) References Cited

U.S. PATENT DOCUMENTS

| | | | | |
|---|---|---|---|---|
| 5,835,959 A | * | 11/1998 | McCool | G06F 12/023 711/171 |
| 7,562,205 B1 | * | 7/2009 | Case | G06F 12/1036 710/26 |
| 7,577,817 B2 | * | 8/2009 | Karpoff | G06F 3/0605 711/114 |

(Continued)

OTHER PUBLICATIONS

Office Action from U.S. Appl. No. 15/269,457, dated Jan. 10, 2018, 16 pp.

(Continued)

*Primary Examiner* — Mark A Giardino, Jr.
(74) *Attorney, Agent, or Firm* — Shumaker & Sieffert, P.A.

(57) ABSTRACT

Methods and apparatus for buffer allocation and memory management are described. A plurality of buffers of a memory may be allocated, by a memory controller, with the buffers having variable sizes. The memory controller may maintain a mapping table that associates each of a plurality of access keys to a respective one of a plurality of page addresses of a plurality of pages of the memory. Each of the buffers may respectively include one or more contiguous pages of the plurality of pages of the memory. Each page of the plurality of pages may include one or more blocks of the memory. The mapping table may include one or more entries organized in a tree structure.

22 Claims, 8 Drawing Sheets

(56) References Cited

U.S. PATENT DOCUMENTS

| | | | |
|---|---|---|---|
| 8,140,821 B1* | 3/2012 | Raizen | G06F 11/1448 |
| | | | 707/637 |
| 8,560,757 B2 | 10/2013 | Pangbom et al. | |
| 8,850,101 B2 | 9/2014 | Pangbom et al. | |
| 8,850,125 B2 | 9/2014 | Pangbom et al. | |
| 8,966,152 B2 | 2/2015 | Bouchard et al. | |
| 9,065,860 B2 | 6/2015 | Pangbom et al. | |
| 9,569,366 B2 | 2/2017 | Pangbom et al. | |
| 9,571,377 B2* | 2/2017 | Banville | |
| 2011/0258391 A1* | 10/2011 | Atkisson | G06F 11/108 |
| | | | 711/118 |
| 2013/0160121 A1 | 6/2013 | Yazdani | |

OTHER PUBLICATIONS

Amendment in Response to Office Action dated Jan. 10, 2018, from U.S. Appl. No. 15/269,457, filed Apr. 10, 2018, 18 pp.

U.S. Appl. No. 15/269,457, filed Sep. 19, 2016, by Goel et al.

Response to Office Action dated May 10, 2018, from U.S. Appl. No. 15/269,457, filed Aug. 10, 2018, 19 pp.

Advisory Action from U.S. Appl. No. 15/269,457, dated Aug. 23, 2018, 3 pp.

Final Office Action from U.S. Appl. No. 15/269,457, dated May 10, 2018, 18 pp.

* cited by examiner

BUFFER ALLOCATION AND MEMORY MANAGEMENT USING MAPPING TABLE

CROSS REFERENCE TO RELATED PATENT APPLICATION(S)

The present disclosure is a continuation-in-part (CIP) and claims the priority benefit of U.S. patent application Ser. No. 15/269,457, filed on Sep. 19, 2016, which is incorporated by reference in its entirety.

TECHNICAL FIELD

The present disclosure generally relates to memory allocation and, more particularly, to on-demand, high-efficiency and high-performance variable-size buffer memory allocation.

BACKGROUND

In a computing apparatus in which memory is used to store data, the memory is typically divided into a number of portions allocated to programs executed on the computing apparatus to store data for the programs. Each allocated portion of the memory is freed for reuse when it is no longer needed by a respective program to which the portion of memory is allocated. There are, however, several issues associated with existing approaches to buffer allocation and management. For example, the allocation size of each portion of the memory is usually pre-specified and may, at times, be larger than what is needed. The efficiency of buffer allocation under existing approaches also tend to be less than optimal at times, as it is possible for a program needing a portion of memory yet not having any portion of the buffer allocated for it. In some cases, there is long latency and low throughput in accessing the memory.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION

Figure 1:
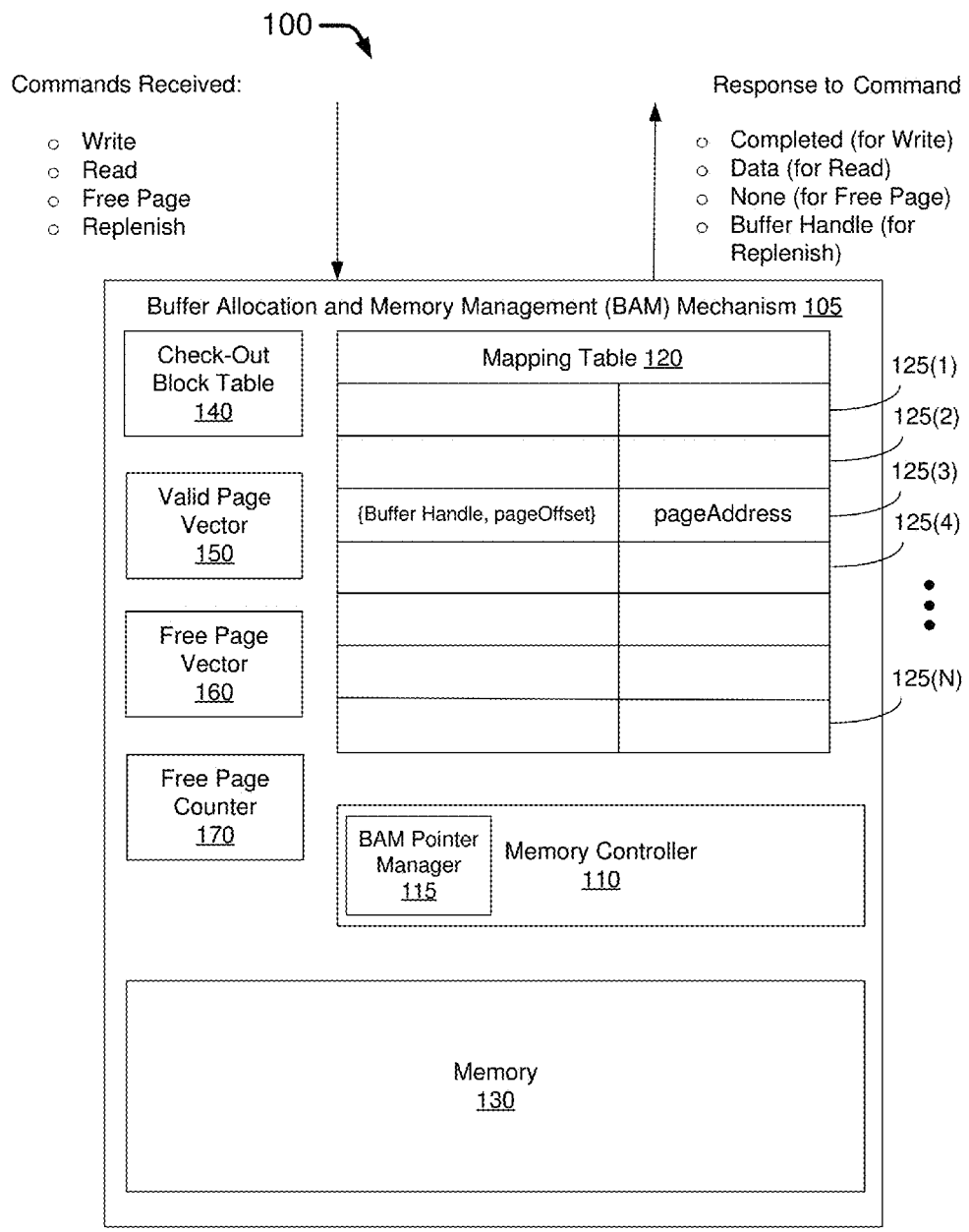
FIG. 1 is a diagram of an example scheme in which various embodiments in accordance with the present disclosure may be implemented.

In the following description, reference is made to the accompanying drawings that form a part thereof, and in which is shown by way of illustrating specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The following detailed description is, therefore, not to be taken in a limiting sense.

Overview

The present disclosure aims to overcome the various issues associated with existing approaches to buffer allocation and management. In various embodiments in accordance with the present disclosure, a novel scheme for variable-size buffer memory allocation provides on-demand allocation with high efficiency and high performance. According to the present disclosure, handle allocation is separate from memory block commitment, and there is no need for pre-specifying allocation size at handle request time. Additionally, buffers and pages may be considered separate resource pools and may be re-assigned by a client after allocation. Moreover, embodiments in accordance with the present disclosure allow deterministic allocation results. For instance, allocation of one or more blocks of memory is guaranteed when one is free, and complete usage of existing memory enhances efficiency. Furthermore, embodiments in accordance with the present disclosure render fast allocation, high-throughput access and bounded access latency. Additionally, according to the present disclosure, the address that a client uses to read and/or write is contiguous. That is, as the client adds byte-offsets to the address to which the client is allocated, the address seamlessly points from one block to a next block in the same buffer even though the data may be actually stored in physical addresses that are not contiguous to one another.

The present disclosure proposes a scheme, mechanisms and techniques pertaining to allocating space in buffer memory and associated system. Embodiments in accordance with the present disclosure may be implemented in an integrated-circuit (IC) chip having two main types of memory to store buffers, namely on-chip memory and off-chip memory. The on-chip memory may be distributed among clusters of cores and/or virtual processors. The off-chip memory may be partitioned into a number of sets. Some of the memory partition may be due to constraints in physical design so as to provide close proximity of the off-chip memory to the cores/virtual processors.

In various embodiments in accordance with the present disclosure, a buffer allocator and memory management (BAM) mechanism may be utilized to achieve on-demand, high-efficiency and high-performance buffer allocation and memory management. Physical organization and structure of the memory may be different for on-chip memory and off-chip memory. Nevertheless, the physical organization and structure of the memory is hidden from external clients such as external engines. This advantageously allows external clients to use the same application programming interface (API) to interface with the BAM mechanism, independent of the physical organization and structure of the memory.

Under the proposed scheme of the present disclosure, an external client may allocate a variable-size and contiguous buffer memory to store data. The buffer memory may be expandable or non-expandable. The data to be stored may be, for example, packets of data such as networking packages from an Ethernet port, or packets denoting storage obtained from a host or a persistent memory controller (e.g., solid-state drive, or SSD). The BAM mechanism may provide to the external client a unique name that identifies the specific buffer allocated to the external client. Subsequently, the external client may use the unique name, along with offset(s), to communicate with the BAM mechanism to access the allocated buffer for read and write transactions. Under the proposed scheme, addresses of physical memory are not visible to external clients as each address of physical memory associated with a buffer is contained in and management by the BAM mechanism.

Example Scheme

FIG. 1 illustrates an example scheme 100 in which various embodiments in accordance with the present disclosure may be implemented. Scheme 100 may involve a BAM mechanism 105 performing various operations to render on-demand, high-efficiency and high-performance buffer allocation and memory management in accordance with the present disclosure. Referring to FIG. 1, BAM mechanism 105 may include various functional blocks, such as a memory controller 110, a mapping table 120 and a memory 130. Memory controller 110 may include a BAM pointer manager 115. Each of the functional blocks may be implemented in the form of hardware, firmware, software or any combination thereof. For instance, memory controller 110 may be implemented with a combination of hardware, firmware and software. Mapping table 120 may be implemented as data in a tree structure stored in or by memory controller 110. The tree structure of mapping table 120 will be described later. Memory 130 may be implemented in the form of hardware.

In the present disclosure, the term "block" refers to a basic unit (and the smallest unit) for storing data for read and write transactions. The block size may be fixed for memory 130. In some embodiments, the block size may be 128B (128 bytes).

In the present disclosure, the term "page" refers to a unit of allocation and deallocation. Each page may include one or more blocks. Available page(s) may be considered a resource pool that can be re-assigned after allocation. For example, for on-chip memory, each page may include one single block. That is, for on-chip memory, the page size may be the same as the block size. In embodiments in which the block size is 128B, the page size may also be 128B for on-chip memory. As another example, for off-chip memory, each page may include multiple blocks. In other words, for off-chip memory, the page size may be larger than the block size. In some embodiments, for off-chip memory, each page may include 128 blocks and, thus, the page size may be 16 KB. The allocation quantum for off-chip memory may be larger than on-chip memory so as to minimize cost (e.g., from the perspective of static random-access memory (SRAM) bits) of control structures in the BAM mechanism 105.

In the present disclosure, the term "buffer" refers to a number of pages, or one or more pages, that are contiguous in the associated buffer space. Available buffer(s) may be considered a resource pool that can be re-assigned after allocation.

In the present disclosure, the term "buffer handle" (bufferHandle) refers to a field that indicates a unique name that identifies a specific buffer that has been allocated. In some embodiments, one or more most-significant bits of the address of the buffer may be used to represent a respective BAM number.

In the present disclosure, the term "page offset" (pageOffset) refers to a field that indicates the page number in a given buffer.

In the present disclosure, the term "block offset" (blockOffset) refers to a field that indicates the block number in a given page. In cases where the page size is equal to the block size (e.g., for on-chip memory), the value of block offset is zero.

In the present disclosure, the term "page address" (pageAddress) refers to a physical address of a field that indicates a page. Physical addresses of where data are actually stored in the memory are not visible to external clients.

In accordance with the present disclosure, BAM mechanism 105 may perform address translation, thereby providing a layer of abstraction for accessing any page offset of an allocated buffer in constant time. BAM mechanism 105 may be implemented in a variety of applications, including processing clusters and network units. In scheme 100, memory controller 110 may provide the arbitration logic for different clients and for locally and remotely initiated block reads and writes as well as allocation and deallocation requests. BAM pointer manager 115 may manage the transactions related to buffer allocations and deallocations. BAM mechanism 105 may provide the physical address of a given page to be used for block read or write in a cluster buffer memory.

In scheme 100, during operation, BAM mechanism 105 may first perform an allocation request for a buffer handle indicating the number of pages. Then, BAM mechanism 105 may perform read and write to the buffer memory using the buffer handle, page offset and block offset within the page. BAM mechanism 105 may translate the buffer handle and page offset to a physical page address. The desired block within the page may be accessed for the read or write transaction. Subsequently, the buffer memory may be deallocated and the associated pages returned to a pool of free (available) pages.

In scheme 100, BAM mechanism 105 may manage allocation of pages using a non-expandable approach or an expandable approach. Under the non-expandable approach, BAM mechanism 105 may associate the number of pages allocated with the buffer handle created in the same allocation request. Boundary checks may be performed for accesses that are out of the range of the buffer memory. The non-expandable approach may be available to a processing core due to sideband signaling limitations for read and write access. Under the non-expandable approach, the number of pages associated with a buffer may be declared at allocation time. Similarly, reads from a page offset that are beyond the number of allocated pages for the buffer may result in a failure.

Under the expandable approach, BAM mechanism 105 may forgo checks for any page allocation boundary for write accesses, and may expand buffer size dynamically as necessary. The expandable approach may be beneficial for use in networking units, for example. Under the expandable approach, the number of pages associated with a collection of buffers may be declared at the time of allocation of any of the buffers in the collection. BAM mechanism 105 may leave the checking of access boundary up to the client, and may expand the tree structure of allocation nodes in mapping table 120 as requested by the write accesses. Under the expandable approach, any write to large page offsets within the allocated buffers may not be flagged by BAM mechanism 105, but may be considered an overuse of resources allocated to the client. It may be up to the client to properly manage the total number of page pointers used. The client may need to deallocate the buffer handles to return the page pointers to a general pool.

In scheme 100, a number of basic API function calls may be utilized. For illustrative purposes and without limitation, detailed description of the API function calls of allocate, deallocate, block_write (or write) and block_read (or read) is provided below.

With respect to the function call of "allocate", a corresponding example command may be expressed as follows: allocate(num_pages[6:0], expandable); returns pass_fail, bufH[12:0]. When the above command is invoked, BAM mechanism 105 may check the number of free page pointers and may decrement the number when there is a sufficient amount of free pages available for allocation. For a single-page allocation, a one-page pointer may be allocated and the value may be returned as the buffer handle, or bufH. The corresponding data structure for the bufH may be updated with an indication of whether or not it is expandable and the number of page pointers actually allocated. For instance, a value of 1 may be used to indicate expandable buffers, and the number of page pointers requested for non-expandable buffers may also be indicated.

With respect to the function call of "deallocate", a corresponding example command may be expressed as follows: deallocate(bufH[12:0]; returns pass_fail. When the above command is invoked, BAM pointer manager 115 may sequence through several steps to "walk the tree" and deallocate page pointers by multiple page pointers at a time (e.g., eight page pointers at a time). BAM pointer manager 115 may return a "pass" when the allocated buffer handle is found and deallocation was successful, and return "fail" if otherwise.

With respect to the function call of "write", a corresponding example command may be expressed as follows: write (bufH[12:0], page_offset[5:0], block_offset[1:0], data[64B], first, last); returns pass_fail. A write operation may provide the buffer handle, page_offset and block_offset within the memory buffer, as well as data corresponding to the block size quantum. Note that the write data provided need not go through the BAM translation logic. BAM mechanism 105 may attempt to find the requested page node and return the physical address if it exists. If the page has not been allocated, BAM mechanism 105 may add the page node to the tree provided that doing so does not violate allocated resource counts or if the buffer handle is marked as expandable.

For the function call of "write", the 'first' and 'last' flags may be used as an optimization feature. Writes that are initiated remotely (e.g., from a different cluster or subsystem) may arrive out of order. To reduce the overhead of sending back acknowledgements for each write access, BAM mechanism 105 may employ a counting system to count the number of write transactions to pages that are performed the 'first' times. The write with the largest offset is also marked with a 'last' indication. When the number of 'first' write transactions matches the offset of the 'last' transaction, BAM mechanism 105 may determine that it has received all the initial writes for a buffer and may acknowledge the final write with a 'last' signal asserted to indicate that a single acknowledgement can now be sent back to the originator. The buffer type may also be changed from expandable to non-expandable. Moreover, BAM mechanism 105 may attempt to translate the address and return the physical page address if it exists. If it is not allocated, the result is a fail.

With respect to the function call of "read", a corresponding example command may be expressed as follows: read (bufH[12:0], page_offset[5:0], block_offset[1:0], deallocate); returns pass_fail, data[64B]. A read operation may provide the buffer handle as well as the page offset and block offset for the transaction. Note that the block offset and quantum of access of the blocks may not be directly visible to BAM mechanism 105. A read with the deallocate flag set may also initiate a deallocation sequence for the buffer memory after the read transaction has been committed for completion. BAM mechanism 105 may attempt to translate the address and return the physical page address if it exists. If no page is allocated, the result is a fail.

In scheme 100, the physical memory associated with memory 130 in BAM mechanism 105 may be implemented with pages of a fixed size. For example, for on-chip buffer memory, each page may include one block. Similarly, for off-chip buffer memory, each page may include a fixed number of blocks (e.g., 128 blocks). As an example, an address (e.g., 64-bit address) that a software client uses to access data may be constructed from a number of bits of buffer handle, a number of bits (e.g., 6 bits) for the byte address of a page or block, a number of bits (e.g., 5 bits) for page offset, a number of bits (e.g., 5 bits) for block offset, and a number of bits (e.g., 5 bits) for byte offset. Although one instance of BAM mechanism 105 is depicted in FIG. 1, scheme 100 is not limited to the context of a single instance of BAM mechanism 105. Rather, scheme 100 may be applicable in scenarios with multiple instances of BAM mechanism 105. Table 1 below provides an example of data structure implementable under scheme 100.

TABLE 1

| Example Data Structure | | |
|---|---|---|
| | On-Chip Memory | Off-Chip Memory |
| Number of instances of BAM mechanism | 16 | 2 |
| Total memory size per BAM mechanism | 2 MB | 1 GB |
| Number of blocks | 16K | 8M |
| Number of blocks per page | 1 | 128 |
| Number of pages | 16K | 128K |
| Number of buffers | 16K | 128K |

In some embodiments, memory controller 110 may maintain mapping table 120 to correlate or otherwise associate a page address of a page to a corresponding access key for a number of allocated pages of memory 130. Mapping table 120 may be an association table and may be implemented with, for example, content-addressable memory (CAM). Referring to FIG. 1, mapping table 120 may include a number of entries 125(1)-125(N), with N being a positive integer greater than or equal to 1. Each of the entries 125(1)-125(N) may store a respective pair of an access key and a page address to indicate an association or correlation between the respective access key and page address. In some embodiments, the access key may include the fields of buffer handle and page offset, and may be expressed as {bufferHandle, pageOffset}. Moreover, a particular block in a given page may be accessed using both the fields of pageAddress and blockOffset. The pageAddress field is not visible outside BAM mechanism 105 and is derived through mapping table 120.

In some embodiments, BAM mechanism 105 may include additional functional blocks such as a check-out block table 140, a valid page vector 150, a free page vector 160 and a free page counter 170.

Valid page vector 150 may be used by memory controller 110 to keep track of number of valid pages. Free page vector 160 may be used by memory controller 110 to keep track of free pages that are not allocated and available for allocation. In some embodiments, free page vector 160 may be implemented in the form of a bit array such that the position of a bit in the vector may determine the page address of a given page. In such instances, memory controller 110 may find a first bit set in the free page vector 160 for address of free pages.

Free page counter 170 may function as a counter and may be used by memory controller 110 to keep track of the number of free pages at any given time. In some embodiments, free page counter 170 enables the implementation of a "lazy allocation" scheme which allocates a page when a block of data is to be written to a page.

In BAM mechanism 105, memory controller 110 may receive various commands from external clients. The commands may include, for example and not limited to, a write command, a read command, a free page command and a replenish (or credit pages) command.

An external client may write data into a block using the write command and provide the fields of bufferHandle, pageOffset and blockOffset with the write command. In some embodiments, the write command for writing data into one or more blocks may be expressed as writeBlock (bufferHandle, pageOffset, blockOffset, Data, Flags). Memory controller 110 may use an access key comprising the fields of bufferHandle and pageOffset, or {bufferHandle, pageOffset}, to look up mapping table 120 for a corresponding page address. In an event that a page (or its corresponding page address) is associated to a given access key, memory controller 110 may use the corresponding page address to write to the block. In an event that no page (or its corresponding page address) is associated to a given access key, memory controller 110 may update mapping table 120 with a new page address corresponding to the access key. In an event that the value of the pageOffset field is zero, memory controller 110 may use the bufferHandle field as the address of a free page available for allocation. This is because there is no need to allocate an entry in mapping table 120 for the first page within a buffer. Alternatively, memory controller 110 may allocate a free page and update mapping table 120 accordingly. In some embodiments, under scheme 100, an external client may check for free pages before issuing a write command. This guarantees available free page(s) for each write command.

For the last block of one or more block of a buffer used to store data with respect to a write command, the Flags field in the write command may be set to "last page." This allows memory controller 110 to set the state of the buffer to "valid" after memory controller 110 receives the last write for the buffer. Any read command or free page command to that buffer may be queued or suspended by memory controller 110 when the state of the buffer is "allocated but not valid", and may be continued when the state of the buffer is "valid". In some implementations, the "last page" flag of the last block may reach memory controller 110 of the BAM mechanism 105 before all previous pages have been written. This is acceptable so long as memory controller 110 maintains a per-handle counter to track the number of pages that have been written as well as the maximum number of "last page" flags. Thus, when the counter reaches the maximum, memory controller 110 may determine that the entire set of pages have been written, and may send a reply to indicate that all the write operations have been completed.

An external client may read data from a block using the read command and provide the fields of bufferHandle, pageOffset and blockOffset with the read command. In some embodiments, the read command for read data from one or more blocks may be expressed as readBlock (bufferHandle, pageOffset, blockOffset). Upon receiving a read command, memory controller 110 may first check the state of the buffer affected by the read command. Memory controller 110 may proceed with execution of the read command when the state of the buffer is "valid"; otherwise, memory controller 110 may queue or suspend execution of the read command when the state of the buffer is "allocated but not valid." Memory controller 110 may use the access key of {bufferHandle, pageOffset} to look up mapping table 120. In an event that a page address corresponding to the access key exists in mapping table 120, memory controller 110 may use the fields of pageAddress and blockOffset, or {pageAddress, blockOffset}, to read a specific block from memory 130. In an event that a page address corresponding to the access key does not exist in mapping table 120, memory controller 110 may return a failure or error message in response to the read command.

An external client may pre-fetch a buffer handle and a number of associated pages by using the replenish (or credit pages) command. In some embodiments, the replenish (or credit pages) command may be expressed as creditPages (number), with the number field indicating the number of pages being pre-fetched. For example, a replenish command of creditPages (number=2) indicates that the external client is requesting for two pages to store a packet. Upon receiving a replenish command, memory controller 110 may decrement the counter value of free page counter 170 by the value of the number field in the replenish command in an event that the counter value is greater than the number of requested pages. Otherwise, in an event that the counter value is not greater than the number of requested pages, memory controller 110 may queue the replenish command and send a reply after sufficient pages are available. As there may be multiple external clients (e.g., software clients) requesting for various numbers of pages (or credits) and being allocated the requested numbers of pages (or credits), memory controller 110 may accumulate the credits allocated. Accordingly, when a write operation to write data into one or more of the pre-fetched pages is completed, memory controller 110 may decrement the accumulation count of the allocated credits. Advantageously, the aforementioned credit scheme is important in various embodiments in accordance with the present disclosure so as to avoid performing an O(N) operation when allocating N pages. That way the cost of adding into the mapping table 120 of the BAM mechanism 105 is spread over each write operation. Thus, allocations and writes take a constant amount of time independent of the size.

In some embodiments, an external client may issue a replenish command of creditPages (number=0) to receive a buffer handle but no page. Accordingly, the counter value of free page counter 170 may remain unchanged and not decremented as a result of this particular command. Moreover, memory controller 110 may allocate one free page out of free page vector 160 and send it as the buffer handle in response to this particular replenish command.

An external client may issue a free page command to free up or otherwise deallocate a buffer when the external client has no further use of the to-be-deallocated buffer. In some embodiments, the free page command may be expressed as Free (bufferHandle, number), with the number field indicating the number of pages in the buffer to be deallocated. Upon receiving a free page command, memory controller 110 may first check the state of the buffer affected by the read command. Memory controller 110 may proceed with execution of the read command when the state of the buffer is "valid." Otherwise, memory controller 110 may queue or suspend execution of the free page command when the state of the buffer is "allocated but not valid." In an event that a page does not exist in mapping table 120 during execution of the free page command, memory controller 110 may reply with an error message.

In some embodiments, a separate table or database may be established and maintained to support different pools of resources. This feature allows better reservation of resources among different functions such as, for example and without limitation, networking computing and direct memory access (DMA) temporary buffering. Entries in such table or database may be updated and checked by a pool identification field specified in each of the existing APIs.

In various embodiments of scheme 100, the size or amount of buffer memory allocated may be increased or decreased at any time and within minimum and maximum bounds. Advantageously, the size or amount of allocated buffer memory may be increased by adding one or more entries in mapping table 120, and the size or amount of allocated buffer memory may be decreased by removing one or more entries in mapping table 120. In contrast, in conventional approaches and designs, the size of allocated buffer memory needs to be determined in advance. Moreover, scheme 100 provides a good match from software perspective of an allocator, with the standard being the POSIX malloc( ) library, which offers malloc( ), free( ) and realloc( ) as entry points, for example.

In addition, scheme 100 allows a distant client to remotely cache and/or reserve allocation. Often times the place that needs to allocate (e.g., client side) is not co-located with the allocator, and this implies that some communication latency (e.g., in the order of several clock cycles) may be inevitable for the client to transmit a request to the allocator and receive a reply from the allocator. Scheme 100 supports a model where the distant client can pre-reserve buffer memory allocations. An example process taking place on the side of the distant client may involve the following: (1) the client may preemptively request for reservation of a number of buffer handles from the allocator; (2) the client may also request for reservation of a number of blocks; (3) when the client needs a new allocation, the client may write into the allocated block of one of the reserved buffer handles and may decrement a reservation count; (4) when a buffer handle has been consumed or when the reserve falls below a certain threshold, the client may request for more buffer handles and more blocks to replenish the reserve. It is noteworthy that the number of buffer handles and the number of blocks reserved may be independent from each other, and this is well suited to applications in which the client does not know upfront the size of allocation that is needed. Under scheme 100, the allocator may remove a given buffer handle from a list of free or available handles when the allocator vends to the client the buffer handle from the list of available handles. When the allocator vends a number of blocks (e.g., multiple blocks) for reservation, the allocator may increment a counter denoting the number of blocks pre-reserved by the number of blocks vended. This counter may be used to ensure that the number of blocks in a list of free or available blocks exceeds the number of blocks reserved. The allocator may decrement the counter any time when a new block is written to indicate a decrease in the number of available blocks. For instance, a check-out block table 140 may be utilized to track or otherwise maintain a count of the number of blocks the allocator vends to one or more clients. The count in check-out block table 140 may be incremented and decremented by the allocator as one or more blocks are vended to client(s) and become available, respectively.

Moreover, scheme 100 advantageously limits the amount that a client needs to reserve. Considering an example case with a 64-byte allocation quantum, a client may need to allocate 64 bytes every cycle, in possibly variable sizes from 64 bytes to 24*64 bytes (or 1536 bytes), with the assumption that the round-trip time to communicate with the allocator is 10 cycles. Under scheme 100 and in various embodiments in accordance with the present disclosure, a reservation of a cache of 10 buffer handles and 24 blocks may be sufficient. When the buffer handles and blocks are coupled, 10 buffer handles of the maximal size would need to be reserved since the client cannot guess which the client may get, and this means a reservation of 240 blocks.

It is noteworthy that, in accordance with various embodiments of the present disclosure, allocation of buffer handles and allocation of pages may be decoupled from each other. That is, pages may be allocated and deallocated without concern of buffer handles. Likewise, buffer handles may be allocated and deallocated without concern of pages.

In conventional approaches and designs, a common pattern is to allocate a seemingly contiguous region of memory and then fill each block, before any read or update occurs. When a block is written an acknowledgement is sent back to the requestor to let the requestor (e.g., client) know that the write is complete. Accordingly, an initial fill process typically includes N write requests that can occur without the requestor waiting for replies, followed by a wait for the N replies. Note that if the communication fabric does not guarantee order, the N replies may come back to the requestor unordered. The rest of the processing (e.g., read and/or update) cannot occur until the N replies have been received. Typically, the client knows when it made the last write, and can tag this last write with information such as "this is the last write of an initial batch of writes".

In various embodiments of scheme 100, the allocator sends one reply, rather than N replies, after it has received all the initial writes. Advantageously, this decreases communication traffic and simplifies the client since it merely needs to wait for one reply rather than N replies. In the case of communication networks that can keep multiple write replies in order, this may be done by tagging the last write. In the case of communication networks that do not guarantee order, scheme 100 may still achieve sending one reply after receiving multiple initial writes. In some embodiments, each write request may have two flags, namely an "initial write" flag and a "last write" flag, where the "last write" flag cannot be set unless the "initial write" flag is also set. In some embodiments, the allocator may, for a given buffer handle, keep track of the following: (a) whether the allocator has seen the "last write" flag, (b) the maximum block offset the allocator has seen for the buffer handle, and (c) the number of offsets that have been written with the "initial write" flag set. In some embodiments, the allocator may send a reply as usual when the allocator receives a request without the "initial write" flag. In some embodiments, after receiving a request with the "initial write" flag set and with the maximum block offset being equal to the number of offsets minus 1, the allocator may determine that all the blocks have been received, independent of the order of arrival, and thus may send one reply. Advantageously, a benefit of this approach is to enforce that a normal write cannot occur until the allocation has been initially filled. This is because the initial writes extend the allocation while non-initial writes do not extend the allocation.

In various embodiments of scheme 100, as information may be stored per buffer handle and as there is a per-handle counter to efficiently and cheaply store information, per-handle metadata may be easily stored. Such metadata may enable a number of uses, including reference counting and "color". Reference counting allocations may be utilized to enable several co-owners to share an allocation and independently release the allocation. With a per-handle side table to store relevant per-handle metadata, this may become relatively cheap to achieve. With respect to "color", the color may denote who allocated a given buffer memory. In some embodiments, the color may be passed in an allocation request, and may be stashed by the allocator. In an example use of color, in an event that it is determined that an allocation leaked (e.g., someone forgot to deallocate), the color may be requested via a debug protocol to help find the root cause of the problem. In another example use of color, the color may be used to enforce isolation of different activities. For instance, a certain activity may pass a color for allocation as well as all the reads and write. Accordingly, in an event that the color of a read or write does not match that of allocation, then it may be determined that there is a bug and hence an exception may be raised. Advantageously, this may help debug memory overruns and other bugs in the firmware.

In view of the above, those of ordinary skill in the art would appreciate that various implementations in accordance with the present disclosure allow allocation of up to 16K buffer handles, and support 16K pages. For on-chip BAM mechanisms, page size may be equal to 128 bytes. In an event that a buffer uses more than one page of memory space, the number of allocated buffer handles may be correspondingly reduced. The depth of different data structures may be determined based on the worst possible case.

Figure 4:
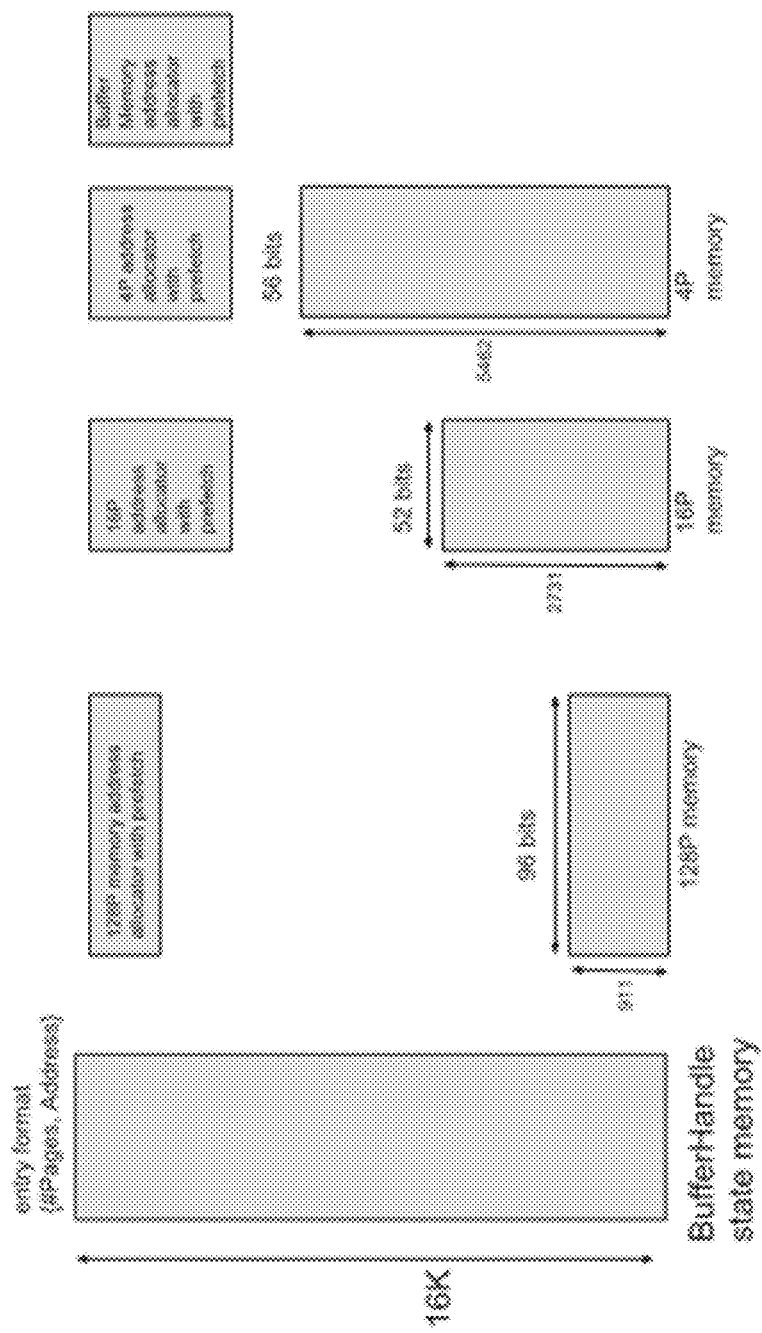
FIG. 4 is a diagram of various example buffer memories in accordance with an embodiment of the present disclosure.

In some embodiments, a buffer handle state memory may be utilized to store the number of pages associated to a given buffer and an address field. Based on the number of pages, the address field may point to different data structures. In some embodiments, in an event that a single page is allocated, the address field may be null since the buffer handle may effectively be the address of that single page. In some embodiments, in an event that two pages are allocated, the address field may contain the address of the second page of the two pages. In some embodiments, in an event that three to five pages are allocated, the address field may point to a four-pointer (4P) memory entry, which may contain up to four pages. The 4P memory entry may store up to four page addresses of the buffer memory. The depth of such structure may be sized based on the maximum number of buffers with three pages in the buffer memory (e.g., 16K divided by 3 yields 5462). In some embodiments, in an event that six to seventeen pages are allocated, the address field may point to a sixteen-pointer (16P) memory entry. The 16P memory entry may store up to four addresses of 4P memory entries. The depth of such structure may be sized based on the maximum number of buffers with six pages in the buffer memory (e.g., 16K divided by 6 yields 2731). In some embodiments, a one hundred twenty-eight-pointer (128P) memory may be utilized to store up to eight addresses of 16P memory entries. The width of such structure may be sufficient to store a buffer memory of a size of 128 pages. The depth of such structure may be sized based on the maximum number of buffers with 18 pages in the buffer memory (e.g., 16K divided by 18). FIG. 4 illustrates various example buffer memories in accordance with an embodiment of the present disclosure. Table 2 below provides a summary of examples of how buffer memories of different sizes may be sized under scheme 100 in accordance with some embodiments of the present disclosure.

TABLE 2

Example Sizing of Buffer Memories of Different Sizes

| Number of Pages in a Buffer | Data Structure in Use | Explanation |
| --- | --- | --- |
| 1 | Buffer Handle state memory | If a buffer has single page, the buffer handle is used as page address, and the # pages field in the buffer handle state memory should be set to 1. Lookup to 128 P memory, 16 P memory and 4 P memory is logically bypassed. |
| 2 | Buffer Handle State memory | If a buffer has two pages, the address stored with buffer handle state memory is an address of the second page (pageOffset = 1) of the buffer # pages field should be set to 2. |
| 3-5 | Buffer Handle State memory and 4 P memory | If a buffer has 3 to 5 pages, the address stored with buffer handle state memory is an address of the 4 P memory. 4 P memory stores four pointers of BAM. Pointer 0 is page address of the second page of the buffer. Pointer 1 is page address of the third page of the buffer. Pointer 2 is page address of the fourth page of the buffer. Pointer 3 is page address of the fifth page of the buffer. |
| 6-17 | Buffer Handle State memory, 16 P memory and 4 P memory | If a buffer has six to seventeen pages, the address stored with buffer handle state memory is an address of the 16 P memory. 16 P memory stores up to four addresses of 4 P memory. If $1 \leq$ pageOffset $\leq 4$, use address-0 stored in 16 P memory. If $5 \leq$ pageOffset $\leq 8$, use address-1 stored in 16 P memory. |

TABLE 2-continued

Example Sizing of Buffer Memories of Different Sizes

| Number of Pages in a Data Buffer | Structure in Use | Explanation |
|---|---|---|
| 18-128 | Buffer Handle State memory, 128 P memory, 16 P memory and 4 P memory | If 9 ≤ pageOffset ≤ 12, use address-2 stored in 16 P memory.<br>If 13 ≤ pageOffset ≤ 16, use address-3 stored in 16 P memory.<br>Final page address from 4 P memory may be generated based on page offset.<br>If a buffer has 18 to 128 pages, the address stored with buffer handle state memory is an address of the 128 P memory.<br>128 P memory stores up to eight addresses of 16 P memory.<br>For N from 0 to 7, if 16*N + 1 ≤ pageOffset ≤ 16*N, use address-N stored in the 128 P memory.<br>Interpretation of 16 P memory may be done based on page offset.<br>Final page address from 4 P memory may be generated based on page offset. |

In various embodiments of scheme 100, each memory read may take a single cycle, while another cycle may be reserved for error-correcting code (ECC) computation and generation of a next memory address. In some embodiments, pageAddress may be generated in eight cycles (e.g., in four sequential memory reads). In some embodiments, hash table design memory latency may be around four cycles.

TABLE 3

Example Pipeline

| Cycle Number | Work Performed/Activity Occurred in Cycle |
|---|---|
| 0 | Read buffer handle state memory. |
| 1 | Perform ECC check.<br>For a write command, increment pageCount as required.<br>Allocate an address from 4 P memory, 16 P memory or 128 P memory as required.<br>Issue write to buffer handle state memory. |
| 2 | Read 128 P state memory (bypassed whenever not required to save power). |
| 3 | Perform ECC check.<br>For a write command, optionally issue write to 128 P memory with 16 P memory addresses. |
| 4 | Read 16 P state memory (bypassed whenever not required to save power). |
| 5 | Perform ECC check.<br>For a write command, optionally issue write to 16 P memory with 4 P addresses. |
| 6 | Read 4 P memory (bypassed whenever not required to save power). |
| 7 | Perform ECC check.<br>Generate page address to write the block.<br>Write 4 P memory with new page address. |

Figure 2:
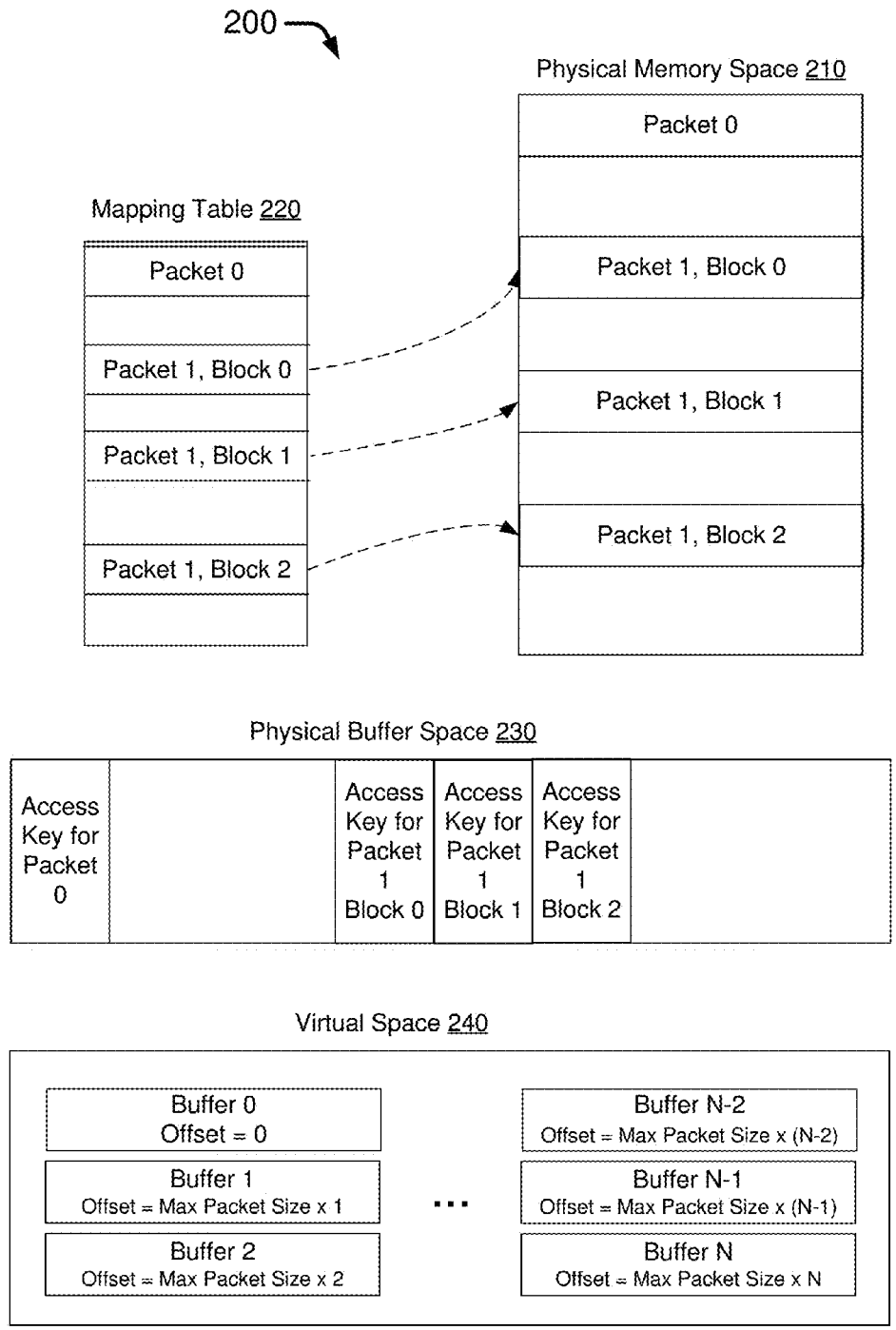
FIG. 2 is a diagram of an example scenario in accordance with an embodiment of the present disclosure.

FIG. 2 illustrates an example scenario 200 in accordance with an embodiment of the present disclosure may be implemented. It shall be understood that scenario 200 is provided as a non-limiting example to illustrate advantages of scheme 100 and, therefore, the scope of the present disclosure is not limited to or by scenario 200. In scenario 200, the size of a basic block of memory is 64B. As an example, a first packet (denoted as "packet 0" in FIG. 2) has a size of 64B and a second package (denoted as "packet 1" in FIG. 2) has a size of 1500B. Accordingly, it takes one block in a physical memory space 210 to store the data of packet 0 while it takes multiple blocks in physical memory space 210 to store the data of packet 1. In physical memory space 210, the multiple blocks used to store the data of packet 1 may be separated apart by other block(s) of memory and thus are not contiguous. In other words, the physical addresses of the multiple blocks of packet 1 in physical memory space 210 are not contiguous.

In scenario 200, a mapping table 220 is used to map access keys for the blocks of packets to their respective physical addresses in physical memory space 210. For packet 1, as an example, mapping table 220 associates or otherwise correlates a number of access keys to the multiple physical addresses, albeit not contiguous, of the multiple blocks of packet 1. Advantageously, with mapping table 220 in accordance with embodiments of the preset disclosure, buffers of variable sizes, which may be expandable or non-expandable, may be allocated in a constant time and the blocks of a given packet with multiple blocks can appear to have contiguous addresses in the physical buffer space, as depicted in physical buffer space 230 in FIG. 2.

Contrast to physical buffer space 230, also shown in scenario 200 is a collection of buffers (e.g., buffer 0-buffer N as shown in FIG. 2) appearing in memory in a virtual space 240. Virtual space 240 may appear to be a very large space with each buffer beginning at a very large increment (e.g., for maximum-size packets). Each buffer in virtual space 240 may include multiple pages, and the pages may be allocated contiguously starting from each buffer offset. In physical buffer space 230, however, it may be much compact in comparison to virtual space 240. Moreover, pages may be allocated randomly, and the total space may correspond to the amount of memory that can actually be used in virtual space 240.

Example Apparatus

Figure 3:
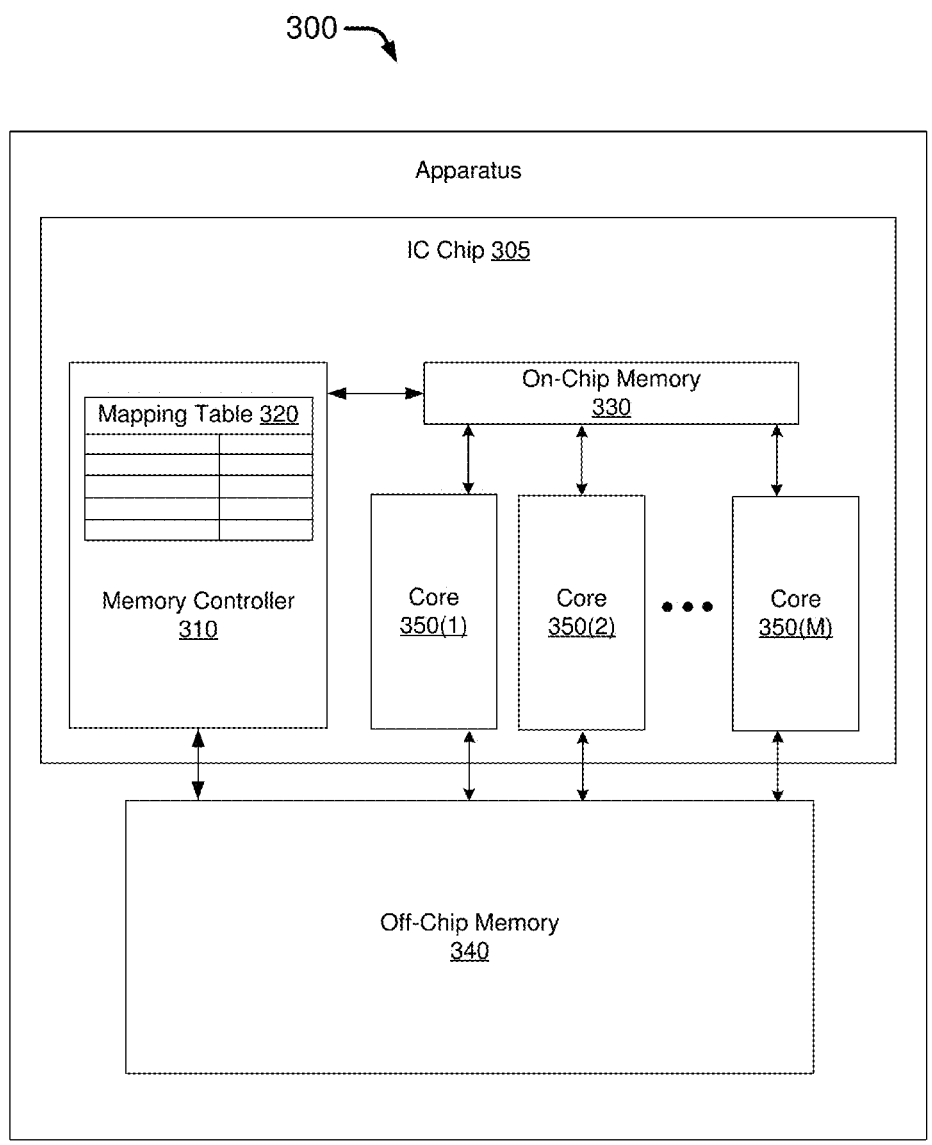
FIG. 3 is a block diagram of an example apparatus in accordance with an embodiment of the present disclosure.

FIG. 3 illustrates an example apparatus 300 in accordance with an embodiment of the present disclosure. Apparatus 300 may perform various functions related to schemes, mechanisms, techniques, processes and methods described herein, including example scheme 100 and scenario 200 described above as well as example process 400 described below. Apparatus 300 may be an example implementation of BAM mechanism 105, whether wholly or partially. Thus, embodiments and techniques described above with respect to scheme 100 are applicable to apparatus 300.

In some implementations, apparatus 300 may be an electronic apparatus or a component thereof, and the electronic apparatus may be, for example and not limited to, a smartphone, a smart wearable apparatus, a mobile or otherwise portable apparatus, an imaging apparatus, or a computing apparatus such as a tablet computer, a laptop computer, a notebook computer, a desktop computer or a server. In some implementations, apparatus 300 may be implemented in the form of one or more IC chips such as, for example and not limited to, one or more multi-core central processing units (CPUs) and/or one or more single-core CPUs.

Apparatus 300 may include some or all of those components shown in FIG. 3, such as a memory controller 310 and associated memory. The memory may include a first-type memory and a second-type memory. The first-type memory may include on-chip memory 330, and the second-type memory may include off-chip memory 340. The on-chip memory 330 may be co-located on one or more IC chips, such as IC chip 305, with one or more cores 350(1)-350(M), where M is a positive integer greater than or equal to 1. That is, memory controller 310, on-chip memory 330 and the one or more cores 350(1)-350(M) may be co-located on one or more IC chips, such as IC chip 305. The on-chip memory 330 may be accessed by at least a first core of the one or more cores 350(1)-350(M). The off-chip memory 340 may be located off the one or more IC chips, such as IC chip 305, and may be accessed by one or more cores of the one or more cores 350(1)-350(M).

Memory controller 310 may be communicatively coupled to the memory (including on-chip memory 330 and off-chip memory 340) to control access to the memory by the one or more cores 350(1)-350(N) and any number of external clients. Memory controller 310 may be configured to perform a number of operations to render on-demand, high-efficiency and high-performance buffer allocation and memory management in accordance with the present disclosure. For instance, memory controller 310 may allocate a plurality of buffers of the memory with the buffers having variable sizes. In some embodiments, memory controller 310 may allowable buffers that are expandable. Alternatively or additionally, memory controller 310 may allocate buffers that are non-expandable. Memory controller 310 may maintain a mapping table 320 that associates each of a plurality of access keys to a respective one of a plurality of page addresses of a plurality of pages of the buffers. Each of the buffers may respectively include one or more contiguous pages of the plurality of pages of the buffers. Each page of the plurality of pages may include one or more blocks for data storage. In some embodiments, in the on-chip memory 330 each page may include a single block of memory, and in the off-chip memory 340 each page may include multiple blocks of memory.

In some embodiments, in allocating the plurality of buffers of the memory, memory controller 310 may allocate each of the plurality of buffers of variable sizes in a constant time. In some embodiments, for each buffer of the plurality of buffers having multiple pages the multiple pages may have contiguous page addresses within the buffer.

In some embodiments, in allocating the plurality of buffers of the memory, memory controller 310 may be configured to perform, for each buffer of the plurality of buffers, a number of operations. For instance, memory controller 310 may assign a unique buffer handle to the buffer. Additionally, memory controller 310 may allocate a page of the one or more contiguous pages included in the buffer to store data, with the allocated page having a respective page address of the plurality of page addresses. Moreover, memory controller 310 may determine a page number of the allocated page, with the unique buffer handle of the buffer and the page number of the allocated page forming a respective access key of the plurality of access keys for the buffer. Furthermore, memory controller 310 may create a respective entry in mapping table 320 for the allocated page of the buffer, with the respective entry associating the respective page address of the allocated page to the respective access key. As indicated above, in various embodiments in accordance with the present disclosure, allocation of pages and allocation of buffer handles may be decoupled from each other. That is, pages may be allocated and deallocated without concern of buffer handles. Similarly, buffer handles may be allocated and deallocated without concern of pages.

In some embodiments, memory controller 310 may be further configured to perform operations regarding replenish transactions. For instance, memory controller 310 may receive (e.g., from an external client or any one of the one or more cores 350(1)-350(M)) a replenish command that requests for a number of pages of the buffers. Memory controller 310 may determine whether the requested number of pages exceeds a quantity of free pages of the buffers available for allocation. In response to a determination that the requested number of pages does not exceed the quantity of free pages of the buffers available for allocation, memory controller 310 may perform the following: (1) selecting a free page for allocation in response to the replenish command, with the selected free page having a respective page address of the plurality of page addresses; (2) assigning a unique buffer handle to the selected free page; and (3) providing a response indicating the unique buffer handle of the selected free space. Additionally, memory controller 310 may determine a page number of the selected free page, with the unique buffer handle of the selected free page and the page number of the selected free page forming a corresponding access key of the plurality of access keys. Moreover, memory controller 310 may create a respective entry in mapping table 320, with the respective entry associating the corresponding access key to the respective page address of the selected free page. Furthermore, memory controller 310 may decrement a free page counter by the number of pages requested by the replenish command.

In some embodiments, memory controller 310 may be further configured to perform operations regarding write transactions. For instance, memory controller 310 may receive (e.g., from an external client or any one of the one or more cores 350(1)-350(M)) a write command to write data into one or more blocks of one or more pages of a buffer of the plurality of buffers. Memory controller 310 may determine whether mapping table 320 includes an entry for a page address of one of the one or more pages associated with the write command. In response to a determination that mapping table 320 includes an entry for a page address of the one of the one or more pages associated with the write command, memory controller 310 may write the data into the one or more blocks of the one or more pages of the buffers. In response to a determination that mapping table 320 includes no entry for a page address of the one of the one or more pages associated with the write command, memory controller 310 may perform the following: (1) identifying a unique buffer handle of the buffer of the plurality of buffers for storing the data for the write command; (2) allocating a page of the one or more contiguous pages included in the buffer to store the data, with the allocated page having a respective page address of the plurality of page addresses; (3) determining a page number of the allocated page, with the unique buffer handle of the buffer and the page number of the allocated page forming a respective access key of the plurality of access keys for the buffer; (4) creating a respective entry in mapping table 320 for the allocated page of the buffer, with the respective entry associating the respective page address of the allocated page to the respective access key; and (5) decrementing a free page counter by a number of pages used to store the data for the replenish command.

In some embodiments, memory controller 310 may be further configured to perform operations regarding read transactions. For instance, memory controller 310 may receive (e.g., from an external client or any one of the one or more cores 350(1)-350(M)) a read command to read data from one or more blocks of one or more pages of a buffer of the plurality of buffers. Memory controller 310 may determine whether a state of the buffer is valid. In response to a determination that the state of the buffer is valid, memory controller 310 may read the data from the one or more blocks of the one or more pages of the buffer. In response to a determination that the state of the buffer is other than valid, memory controller 310 may suspend execution of the read command.

In some embodiments, memory controller 310 may be further configured to perform operations regarding free page transactions. For instance, memory controller 310 may receive (e.g., from an external client or any one of the one or more cores 350(1)-350(M)) a free page command to deallocate one or more pages of a buffer of the plurality of buffers. Memory controller 310 may determine whether a state of the buffer is valid. In response to a determination that the state of the buffer is valid, memory controller 310 may deallocate the buffer by performing the following: (1) removing an entry in mapping table 320 pertaining to a page address of a page of one or more pages in the deallocated buffer; and (2) incrementing a free page counter by a number of pages in the deallocated buffer. In response to a determination that the state of the buffer is other than valid, memory controller 310 may suspend execution of the free page command.

Example Mapping Table Implementations

In accordance with various embodiments of the present disclosure, a mapping table (e.g., mapping table 120, mapping table 220 and mapping table 320) may be implemented using a stack of indirection tables. Such implementation allows guaranteed allocation (if space is available) and constant time for read and write transactions for a buffer memory. Advantageously this scheme offers guaranteed insertion and lookup time. A mapping table in accordance with the present disclosure supports at least the commands of allocate, deallocate, block_read and block_write, as described above. In some instances, one-read-one-write (1R1W) port memories may be utilized to process one command every clock cycle. Moreover, a mapping table in accordance with the present disclosure supports deterministic lookup, insertion and deletion. Although the mapping table (e.g., for mapping of {bufferHandle, offset} to page address) may also be implemented using a hash table, hash table does not offer insertion guarantee. That is, if an insertion of an entry is attempted in a hash table, the entry to be inserted may collide with an existing entry in the hash table. Due to collision of multiple entries in the hash table, an entry may not be inserted in the hash table. Despite existence of various approaches dealing with collisions in a hash table, constant insertion time is not offered by those approaches.

In accordance with various embodiments of the present disclosure, there may be multiple designs of mapping tables (specific to design) to accommodate various allocation sizes. FIG. 4 illustrates multiple example mapping tables to support allocation of buffer memory from one page to 128 pages.

Figure 5:
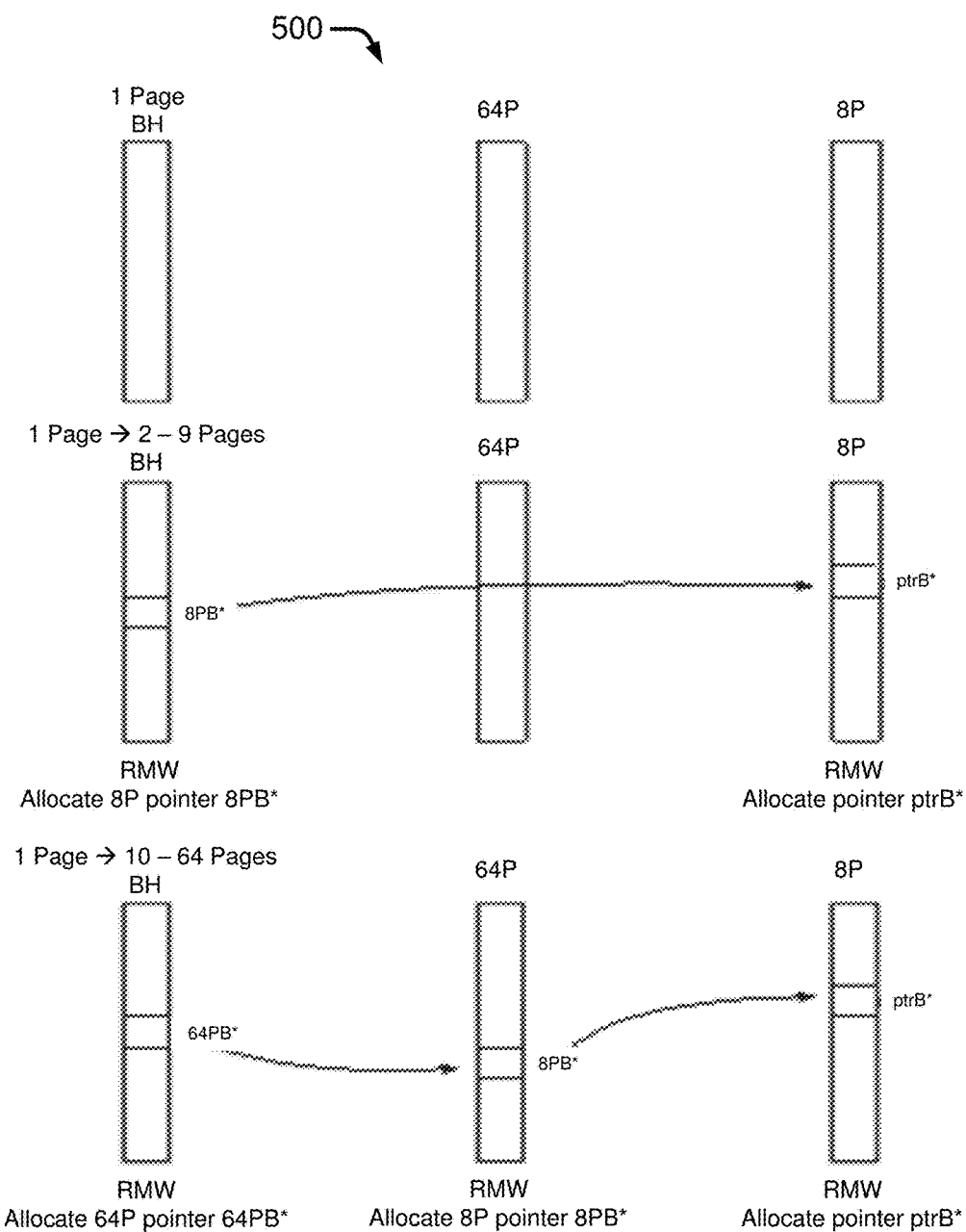
FIG. 5 is a diagram of a first example tree structure in accordance with an embodiment of the present disclosure.
Figure 6:
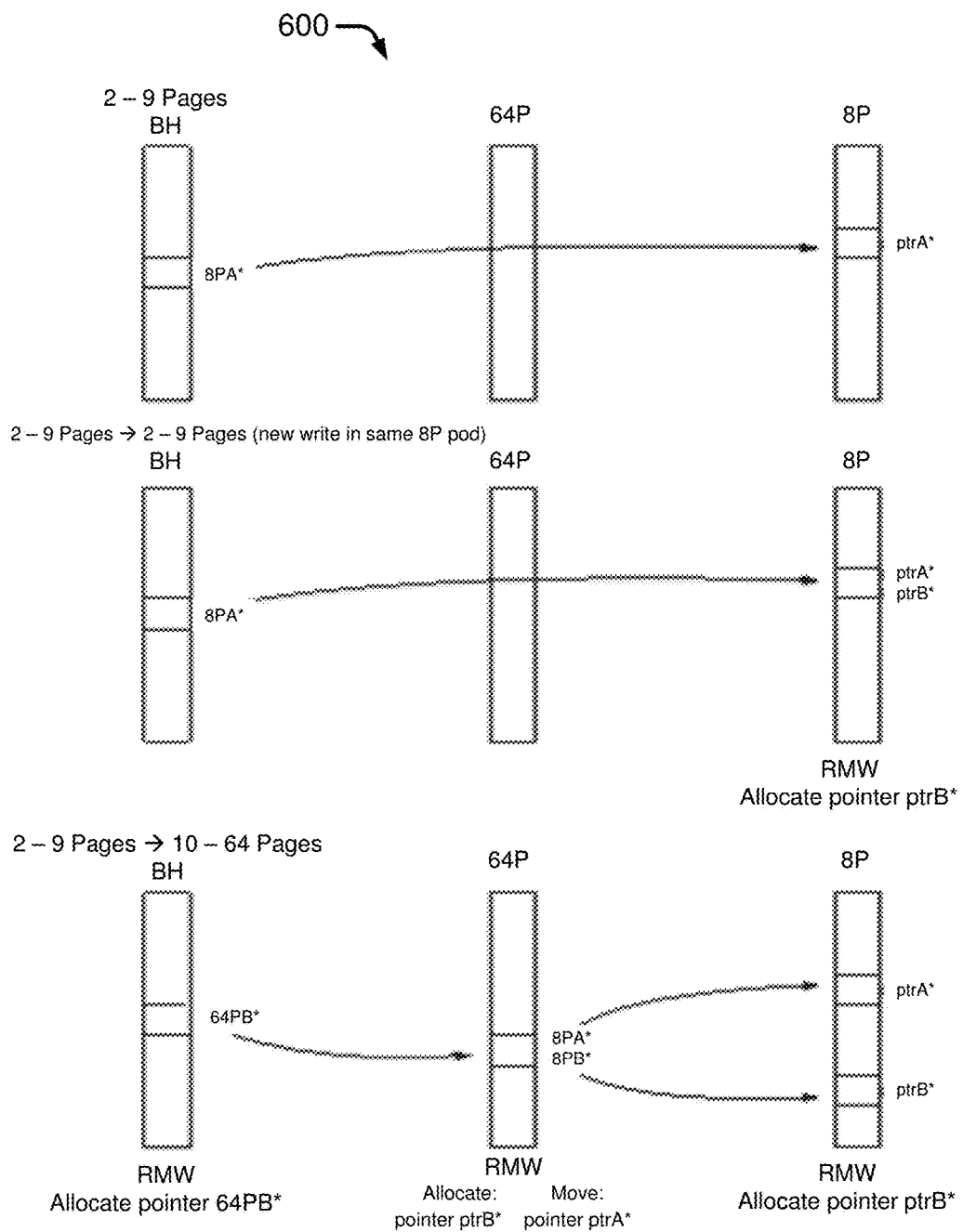
FIG. 6 is a diagram of a second example tree structure in accordance with an embodiment of the present disclosure.
Figure 7:
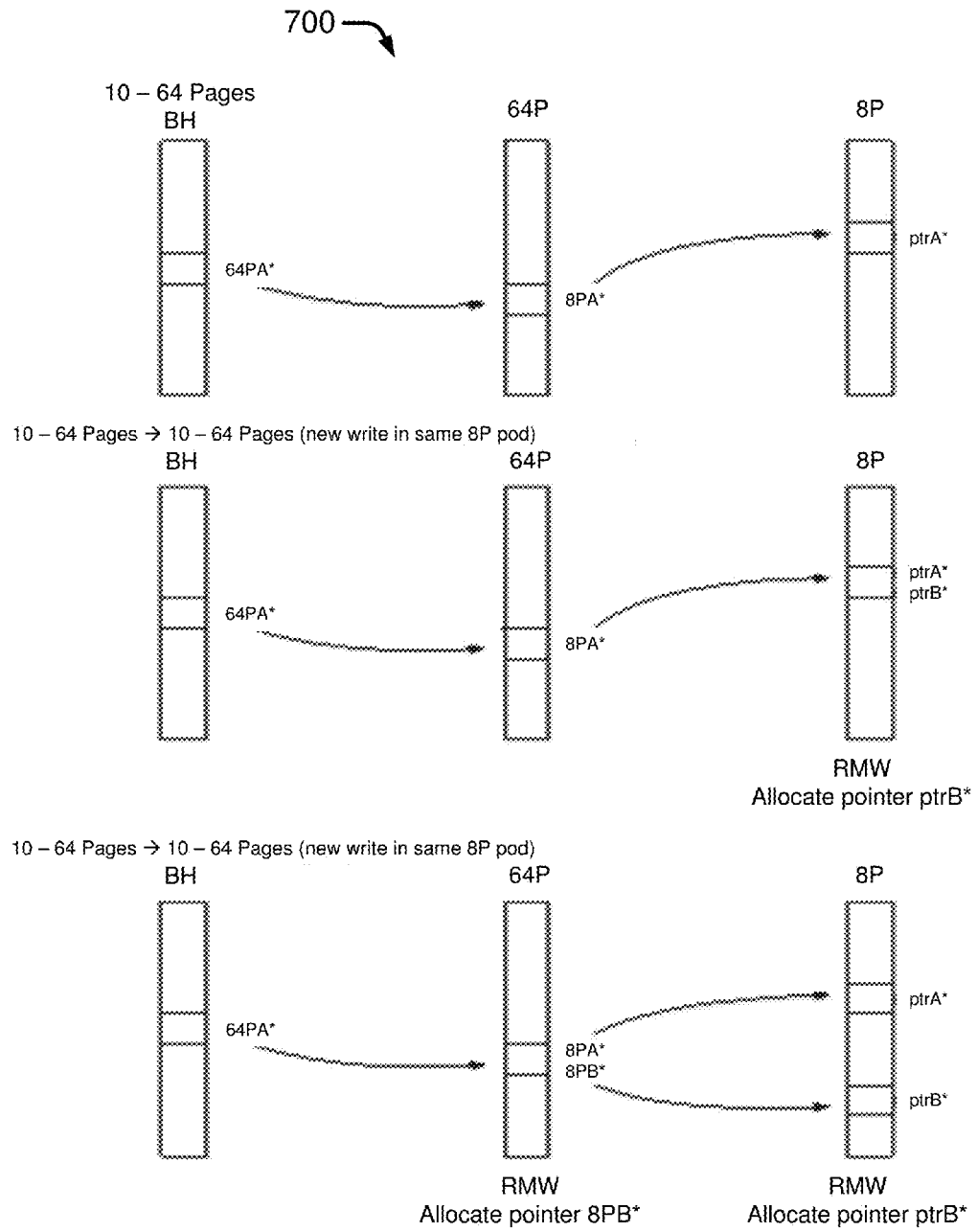
FIG. 7 is a diagram of a third example tree structure in accordance with an embodiment of the present disclosure.

FIG. 5-FIG. 7 illustrate a first example tree structure 500, a second example tree structure 600, and a third example tree structure 700 as example implementations of mapping tables in accordance with some embodiments of the present disclosure. In these examples, tree structure 500 is a one-page tree structure, tree structure 600 is a two-to-nine-page tree structure, and tree structure 700 is a ten-to-64-page tree structure.

Referring to FIG. 5, the one-page tree structure 500 is the simplest case where the buffer handle serves as the physical address of the single page. All newly allocated buffers begin as one-page trees until a write is performed, and the tree is dynamically grown to the appropriate (and permissible) size.

In FIG. 5, the top row illustrates the three main data structures and how they are essentially empty for one-page trees. In actuality, the buffer handle or buffer handle stage is initialized and stored in a buffer memory (e.g., the memory block on the left-hand side of the top row and labeled as "BH") with configuration about whether the buffer is expandable and the maximum size if it is not expandable. It is possible to have a two-page tree structure by allowing a page pointer to be installed in the buffer handle level, but this feature may add complexity by requiring either two read-modify-write (RMW) transactions at the eight-pointer (8P) level or the ability to install page pointers at the sixty-four-pointer (64P) level. Thus, in some cases, this feature may not be implemented for the sake of simplicity.

In FIG. 5, the middle row illustrates the transitions needed if a permissible write is made to an offset that requires a tree of 2-9 page nodes. In this case, an 8P pointer is allocated and installed in the buffer handle memory. This 8P pointer references a corresponding 8P data structure in an 8P memory (e.g., the memory block on the right-hand side of the top row and labeled as "8P"). The new page pointer is allocated for the write transaction and is installed in the newly created 8P data structure.

In FIG. 5, the bottom row illustrates the transitions required if the initial change from a one-page tree structure was made to create a tree that supports 10-64 page nodes. In this case, a 64P pointer is allocated and installed in the buffer handle memory. An 8P pointer is allocated and installed in the new 64P data structure in a 64P memory (e.g., the memory block in the middle of the top row and labeled as "64P"), and a page pointer is allocated and installed in the new 8P data structure.

Referring to FIG. 6, for the 2-9 page tree structure 600, the buffer handle itself still serves as the 0 page offset node, but the buffer memory contains an 8P pointer (e.g., the memory block on the left-hand side of the top row and labeled as "BH") that references a 8P data structure in an 8P memory (e.g., the memory block on the right-hand side of the top row and labeled as "8P") that contains the remaining (up to eight) pointers.

In FIG. 6, the middle row illustrates the transitions used to create another node in the same basic 2-9 page structure when the tree has not been fully populated yet. Here, the new offset is accessed, and depending on the validity of the entry accessed, a new page pointer may be allocated and installed to populate the entry. The example in FIG. 6 shows the final state where a second page pointer is installed in the 8P data structure as a result of the write.

In FIG. 6, the bottom row illustrates that the 2-9 page tree structure is expanded into a 10-64 page tree structure. In this case, a 64P pointer is allocated and installed in the buffer handle entry in a 64P memory (e.g., the memory block in the middle of the bottom row and labeled as "64P"). The original 8P pointer in the buffer memory is moved to the 64P data structure. A second 8P pointer and page pointer are allocated and installed for the newly written page.

Referring to FIG. 7, the 10-64 page tree structure is the largest type and needs a pointer installed in each of the three data structures. There is no tree structure expansions that can occur at this stage; however, new nodes may still be installed in a partially filled tree. In FIG. 7, the top row illustrates an example starting tree structure. In FIG. 7, the middle row illustrates the installation of a new page node within an 8P data structure in an 8P memory (e.g., the memory block on the right-hand side of the top row and labeled as "8P") that already exists. A new page pointer is allocated and installed in the 8P data structure. In FIG. 7, the bottom row illustrates the case where a new 8P pointer needs to be allocated to accommodate the new page pointer.

Thus, each of tree structure 500 and tree structure 600 is an expandable structure in that tree structure 500 may be expanded into tree structure 600 or tree structure 700 depending on the need, and tree structure 600 may be expanded into tree structure 700 depending on the need. Moreover, each of tree structures 500, 600 and 700 may be, at least initially, seen as a one-level tree structure, two-level tree structure and three-level tree structure, respectively. Specifically, tree structure 500 may initially start out as a one-level tree (for 1 page), but can expand into a two-level tree (for 2-9 pages) and even a three-level tree (for 10-64 pages). Similarly, tree structure 600 may initially start out as a two-level tree (for 2-9 pages), but can expand into a three-level tree (for 10-64 pages). Accordingly, when a one-level tree expands into a two-level tree, a 8P pointer is created in the buffer handle to reference up to eight page pointers in a newly created 8P data structure. Subsequently, when it is necessary to expand the two-level tree into a three-level tree, each of the eight page pointers originally in the 8P data structure becomes a respective 8P pointer in a newly created 64P data structure to reference to up to eight page pointers in the 8P data structure. In all the transactions shown in FIG. 5-FIG. 7, only a single RMW transaction is needed in each data structure. It is noteworthy that, the proposed scheme is flexible and can be used to build a tree structure of multiple levels (e.g., multi-level tree) with more number of levels than tree structure 700. That is, under the proposed scheme, a multi-level tree structure with a number of levels anywhere between 2 and N is possible, where N is a positive integer greater than 1. In other words, although a one-level tree, a two-level tree and a three-level tree are shown in FIGS. 5-7, respectively, tree structures of more than three levels are also within the scope of the present disclosure.

Example Process

Figure 8:
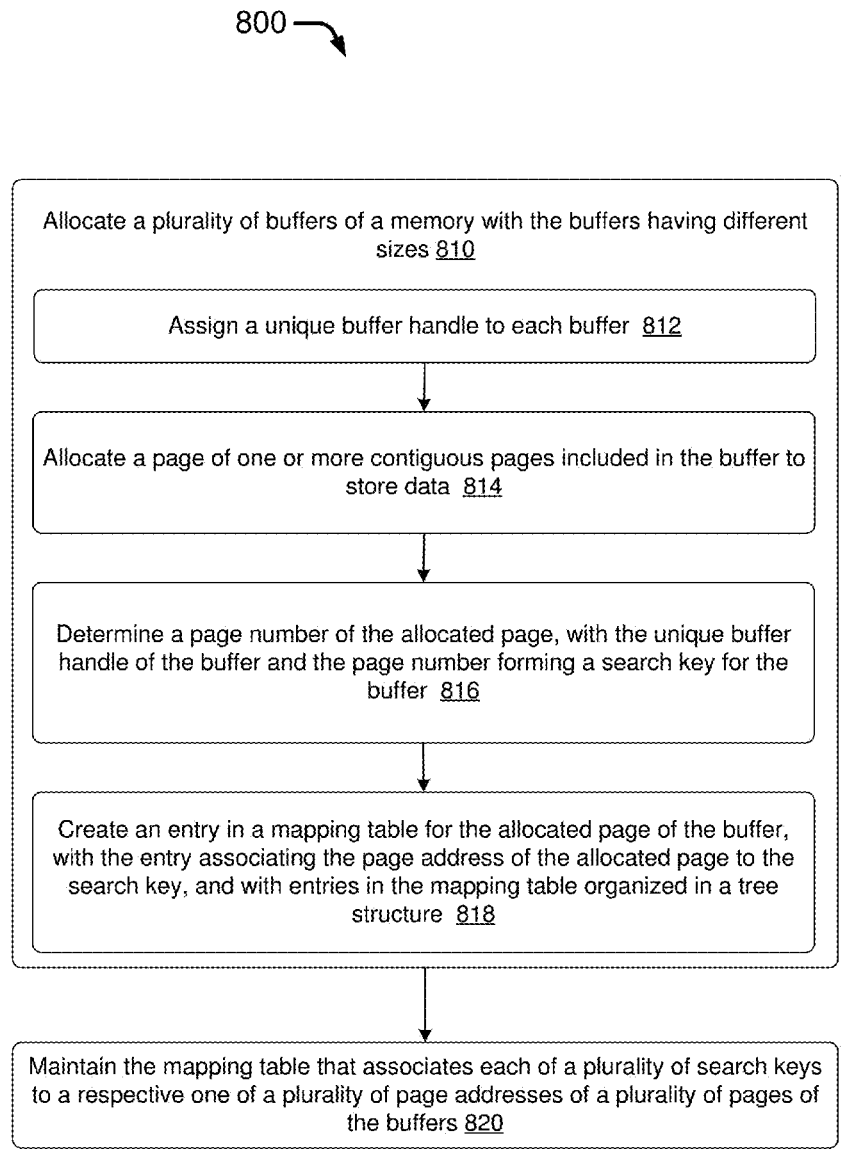
FIG. 8 is a flowchart of an example process in accordance with an embodiment of the present disclosure.

FIG. 8 illustrates an example process 800 for buffer allocation and memory management in accordance with an embodiment of the present disclosure. Process 800 may include one or more operations, actions, or functions shown as blocks such as 810 and 820 as well as sub-blocks 812, 814, 816 and 818. Although illustrated as discrete blocks, various blocks of process 800 may be divided into additional blocks, combined into fewer blocks, or eliminated, depending on the desired implementation. The blocks of process 800 may be performed in the order shown in FIG. 8 or in any other order, depending on the desired implementation. Process 800 may be implemented by BAM mechanism 105 and apparatus 300 as well as any variations and/or derivatives thereof. Solely for illustrative purposes and without limitation, process 800 is described below in the context of BAM mechanism 105. That is, operations described below may be performed by memory controller 110 of BAM mechanism 105 as well as memory controller 310 of apparatus 300. Process 800 may begin at block 810.

At 810, process 800 may involve memory controller 110 of BAM mechanism 105 allocating a plurality of buffers of memory 130 with the buffers having variable sizes. In allocating the buffers, process 800 may involve memory controller 110 performing a number of operations for each buffer of the plurality of buffers, as shown in sub-blocks 812, 814, 816 and 818. At 812, process 800 may involve memory controller 110 assigning a unique buffer handle to the buffer. At 814, process 800 may involve memory controller 110 allocating a page of the one or more contiguous pages included in the buffer to store data, with the allocated page having a respective page address of the plurality of page addresses. At 816, process 800 may involve memory controller 110 determining a page number of the allocated page, with the unique buffer handle of the buffer and the page number of the allocated page forming a respective access key of the plurality of access keys for the buffer. At 818, process 800 may involve memory controller 110 creating a respective entry in mapping table 120 for the allocated page of the buffer, with the respective entry associating the respective page address of the allocated page to the respective access key. Mapping table 120 may include one or more entries organized in a tree structure. Process 800 may proceed from 810 to 820.

At 820, process 800 may involve memory controller 110 maintaining mapping table 120 that associates each of a plurality of access keys to a respective one of a plurality of page addresses of a plurality of pages of the buffers of memory 130. Each of the buffers may respectively include one or more contiguous pages of the plurality of pages of the buffers. Each page of the plurality of pages may include one or more blocks for data storage.

In some embodiments, in maintaining the mapping table, process 800 may involve memory controller 110 assigning a unique buffer handle to the buffer. Moreover, process 800 may also involve memory controller creating a one-level tree structure, as the tree structure of the mapping table, to accommodate a single page. The buffer handle may serve as a physical address of the single page.

In some embodiments, in maintaining the mapping table, process 800 may also involve memory controller 110 initializing the buffer handle with configuration indicating whether the buffer is expandable. In an event that the buffer is non-expandable, the configuration may also indicate a maximum size of the buffer.

Additionally, in maintaining the mapping table, process 800 may involve memory controller 110 expanding the one-level tree structure into a two-level tree structure to accommodate a first number of plural pages. In expanding the one-level tree structure into the two-level tree structure, process 800 may involve memory controller 110 creating a multi-page pointer at a top level of the tree structure to reference one or more single-page pointers at a bottom level of the tree structure. Moreover, process 800 may involve memory controller 110 creating the one or more single-page pointers at the bottom level of the tree structure with each of the one or more single-page pointers referencing a respective page.

Furthermore, in maintaining the mapping table, process 800 may involve memory controller 110 expanding the two-level tree structure into a three-level tree structure to accommodate a second number of plural pages, with the second number greater than the first number. In expanding the two-level tree structure into the three-level tree structure, process 800 may involve memory controller 110 creating a multi-page pointer at the top level of the tree structure to reference one or more multi-page pointers at a middle level of the tree structure. Additionally, process 800 may involve memory controller 110 creating the one or more multi-page pointers at the middle level of the tree structure with each of the one or more multi-page pointers referencing one or more single pointers of a plurality of single-page pointers at the bottom level of the tree structure. Moreover, process 800 may involve memory controller 110 creating the plurality of single-page pointers at the bottom level of the tree structure with each of the plurality of single-page pointers referencing a respective page.

In some embodiments, in maintaining the mapping table, process 800 may involve memory controller 110 assigning a unique buffer handle to the buffer. Moreover, process 800 may involve memory controller 110 creating a two-level tree structure, as the tree structure of the mapping table, to accommodate a first number of plural pages, with the buffer handle serving as a physical address of a first page of the plural pages. In creating the one-level tree structure, process 800 may involve memory controller 110 creating a multi-page pointer at a top level of the tree structure to reference one or more single-page pointers at a bottom level of the tree structure. Furthermore, process 800 may involve memory controller 110 creating the one or more single-page pointers at the bottom level of the tree structure with each of the one or more single-page pointers referencing a respective page. Additionally, in maintaining the mapping table, process 800 may involve memory controller 110 expanding the two-level tree structure into a three-level tree structure to accommodate a second number of plural pages, with the second number greater than the first number. In expanding the two-level tree structure into the three-level tree structure, process 800 may involve memory controller 110 creating a multi-page pointer at the top level of the tree structure to reference one or more multi-page pointers at a middle level of the tree structure. Also, process 800 may involve memory controller 110 creating the one or more multi-page pointers at the middle level of the tree structure with each of the one or more multi-page pointers referencing one or more single pointers of a plurality of single-page pointers at the bottom level of the tree structure. Moreover, process 800 may involve memory controller 110 creating the plurality of single-page pointers at the bottom level of the tree structure with each of the plurality of single-page pointers referencing a respective page.

In some embodiments, in maintaining the mapping table, process 800 may involve memory controller 110 assigning a unique buffer handle to the buffer. Additionally, process 800 may involve memory controller 110 creating a two-level tree structure, as the tree structure of the mapping table, for a first page and a second page. Furthermore, process 800 may involve memory controller 110 creating a page pointer that points from the first page to the second page. The buffer handle may serve as a physical address of the first page.

In some embodiments, in allocating the plurality of buffers of the memory, process 400 may involve memory controller 110 allocating each of the plurality of buffers of variable sizes in a constant time.

In some embodiments, for each buffer of the plurality of buffers having multiple pages the multiple pages may have contiguous page addresses within the buffer.

In some embodiments, process 400 may involve memory controller 110 performing further operations regarding replenish transactions. For instance, process 400 may involve memory controller 110 receiving, from an external client, a replenish command that requests for a number of pages of the buffers. Process 400 may also involve memory controller 110 determining whether the requested number of pages exceeds a quantity of free pages of the buffers available for allocation. In response to a determination that the requested number of pages does not exceed the quantity of free pages of the buffers available for allocation, process 400 may involve memory controller 110 performing the following: (1) selecting a free page for allocation in response to the replenish command, with the selected free page having a respective page address of the plurality of page addresses; (2) assigning a unique buffer handle to the selected free page; and (3) providing a response indicating the unique buffer handle of the selected free space. Process 400 may additionally involve memory controller 110 determining a page number of the selected free page, with the unique buffer handle of the selected free page and the page number of the selected free page forming a corresponding access key of the plurality of access keys. Process 400 may also involve memory controller 110 creating a respective entry in mapping table 120, with the respective entry associating the corresponding access key to the respective page address of the selected free page. Process 400 may further involve memory controller 110 decrementing a free page counter by the number of pages requested by the replenish command.

In some embodiments, process 400 may involve memory controller 110 performing further operations regarding write transactions. For instance, process 400 may involve memory controller 110 receiving, from an external client, a write command to write data into one or more blocks of one or more pages of a buffer of the plurality of buffers. Process 400 may also involve memory controller 110 determining whether mapping table 120 includes an entry for a page address of one of the one or more pages associated with the write command. In response to a determination that mapping table 120 includes an entry for a page address of the one of the one or more pages associated with the write command, process 400 may involve memory controller 110 writing the data into the one or more blocks of the one or more pages of the buffers. In response to a determination that mapping table 120 includes no entry for a page address of the one of the one or more pages associated with the write command, process 400 may involve memory controller 110 performing the following: (1) identifying a unique buffer handle of the buffer of the plurality of buffers for storing the data for the write command; (2) allocating a page of the one or more contiguous pages included in the buffer to store the data, with the allocated page having a respective page address of the plurality of page addresses; (3) determining a page number of the allocated page, with the unique buffer handle of the buffer and the page number of the allocated page forming a respective access key of the plurality of access keys for the buffer; (4) creating a respective entry in mapping table 120 for the allocated page of the buffer, with the respective entry associating the respective page address of the allocated page to the respective access key; and (5) decrementing a free page counter by a number of pages used to store the data for the replenish command.

In some embodiments, process 400 may involve memory controller 110 performing further operations regarding read transactions. For instance, process 400 may involve memory controller 110 receiving, from an external client, a read command to read data from one or more blocks of one or more pages of a buffer of the plurality of buffers. Process 400 may also involve memory controller 110 determining whether a state of the buffer is valid. In response to a determination that the state of the buffer is valid, process 400 may involve memory controller 110 reading the data from the one or more blocks of the one or more pages of the buffer. In response to a determination that the state of the buffer is other than valid, process 400 may involve memory controller 110 suspending execution of the read command.

In some embodiments, process 400 may involve memory controller 110 performing further operations regarding free page transactions. For instance, process 400 may involve memory controller 110 receiving, from an external client, a free page command to deallocate one or more pages of a buffer of the plurality of buffers. Process 400 may also involve memory controller 110 determining whether a state of the buffer is valid. In response to a determination that the state of the buffer is valid, process 400 may involve memory controller 110 deallocating the buffer by performing the following: (1) removing an entry in mapping table 120 pertaining to a page address of a page of one or more pages in the deallocated buffer; and (2) incrementing a free page counter by a number of pages in the deallocated buffer. In response to a determination that the state of the buffer is other than valid, process 400 may involve memory controller 110 suspending execution of the free page command.

In some embodiments, memory 130 may include on-chip memory and off-chip memory. The on-chip memory may be co-located on one or more IC chips with one or more cores, and may be accessed by at least a first core of the one or more cores. The off-chip memory may be located off the one or more IC chips, and may be accessed by at least a second core of the one or more cores.

In some embodiments, in the on-chip memory each page may include a single block of memory. Moreover, in the off-chip memory each page may include multiple blocks of memory.

Additional Notes

The articles "a" and "an" are used herein to refer to one or to more than one (i.e., to at least one) of the grammatical object of the article. By way of example, "a user" means one user or more than one users. Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code or the like), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks.

Although the present disclosure is described in terms of certain embodiments, other embodiments will be apparent to those of ordinary skill in the art, given the benefit of this disclosure, including embodiments that do not provide all of the benefits and features set forth herein, which are also within the scope of this disclosure. It is to be understood that other embodiments may be utilized, without departing from the scope of the present disclosure.

The invention claimed is:

1. A method of buffer allocation and memory management, comprising:

allocating, by a memory controller, a plurality of buffers of a memory with the buffers having variable sizes, wherein each of the buffers comprises one or more pages that are contiguous within a physical buffer space of the respective one of the buffers, wherein each of the pages comprises one or more blocks for data storage, and wherein the one or more pages within the physical buffer space correspond to one or more page addresses of a plurality of page addresses within a physical memory space of the memory;

maintaining, by the memory controller, a mapping table that includes one or more entries organized in a tree structure, wherein each of the entries associates one of a plurality of access keys for the buffers to a respective one of the plurality of page addresses within the physical memory space of the memory, wherein each of the plurality of access keys comprises a unique buffer handle that indicates a buffer of the plurality of buffers and a page number of one of the pages within the physical buffer space of the buffer;

receiving, by the memory controller and from a processing core, a command to access the buffer of the plurality of buffers, wherein the command includes the unique buffer handle that indicates the buffer and the page number of one of the pages within the physical buffer space of the buffer;

determining, by the memory controller and based on the mapping table, a page address within the physical memory space of the memory using an access key comprising the unique buffer handle and the page number included in the command; and performing, by the memory controller, the command using the page address within the physical memory space of the memory.

2. The method of claim 1, wherein the maintaining of the mapping table comprises:
assigning the unique buffer handle to the buffer of the plurality of buffers; and
creating a one-level tree structure, as the tree structure of the mapping table, to accommodate a single page within the physical buffer space of the buffer,
wherein the unique buffer handle serves as a physical address of the single page within the physical buffer space of the buffer.

3. The method of claim 2, further comprising:
initializing the unique buffer handle of the buffer with configuration indicating whether the buffer is expandable,
wherein, in an event that the buffer is non-expandable, the configuration further indicates a maximum size of the buffer.

4. The method of claim 2, further comprising:
expanding the one-level tree structure of the mapping table into a two-level tree structure to accommodate a first number of plural pages within the physical buffer space of the buffer,
wherein the expanding of the one-level tree structure into the two-level tree structure comprises:
creating a multi-page pointer at a top level of the tree structure to reference one or more single-page pointers at a bottom level of the tree structure; and
creating the one or more single-page pointers at the bottom level of the tree structure with each of the one or more single-page pointers referencing a respective page within the physical buffer space of the buffer.

5. The method of claim 4, further comprising:
expanding the two-level tree structure of the mapping table into a multi-level tree structure to accommodate a second number of plural pages within the physical buffer space of the buffer,
wherein the second number is greater than the first number,
wherein the multi-page pointer comprises a first multi-page pointer, and
wherein the expanding of the two-level tree structure into the multi-level tree structure comprises:
creating a second multi-page pointer at the top level of the tree structure to reference one or more first multi-page pointers at a middle level of the tree structure;
creating the one or more first multi-page pointers at the middle level of the tree structure with each of the one or more first multi-page pointers referencing one or more single pointers of a plurality of single-page pointers at the bottom level of the tree structure; and
creating the plurality of single-page pointers at the bottom level of the tree structure with each of the plurality of single-page pointers referencing a respective page within the physical buffer space of the buffer.

6. The method of claim 1, wherein the maintaining of the mapping table comprises:
assigning the unique buffer handle to the buffer of the plurality of buffers; and
creating a two-level tree structure, as the tree structure of the mapping table, to accommodate a first number of plural pages within the physical buffer space of the buffer,
wherein the unique buffer handle serves as a physical address of a first page of the plural pages within the physical buffer space of the buffer, and
wherein the creating of the two-level tree structure comprises:
creating a multi-page pointer at a top level of the tree structure to reference one or more single-page pointers at a bottom level of the tree structure; and
creating the one or more single-page pointers at the bottom level of the tree structure with each of the one or more single-page pointers referencing a respective page within the physical buffer space of the buffer.

7. The method of claim 6, further comprising:
expanding the two-level tree structure of the mapping table into a three-level tree structure to accommodate a second number of plural pages within the physical buffer space of the buffer,
wherein the second number is greater than the first number,
wherein the multi-page pointer comprises a first multi-page pointer, and
wherein the expanding of the two-level tree structure into the three-level tree structure comprises:
creating a second multi-page pointer at the top level of the tree structure to reference one or more first multi-page pointers at a middle level of the tree structure;
creating the one or more first multi-page pointers at the middle level of the tree structure with each of the one or more first multi-page pointers referencing one or more single pointers of a plurality of single-page pointers at the bottom level of the tree structure; and
creating the plurality of single-page pointers at the bottom level of the tree structure with each of the plurality of single-page pointers referencing a respective page within the physical buffer space of the buffer.

8. The method of claim 1, wherein the maintaining of the mapping table comprises:
assigning the unique buffer handle to the buffer of the plurality of buffers;
creating a two-level tree structure, as the tree structure of the mapping table, for a first page and a second page within the physical buffer space of the buffer; and
creating a page pointer that points from the first page to the second page,
wherein the unique buffer handle serves as a physical address of the first page within the physical buffer space of the buffer.

9. The method of claim 1, wherein the allocating of the plurality of buffers of the memory comprises allocating each of the plurality of buffers of variable sizes in a constant time.

10. The method of claim 1, wherein the allocating of the plurality of buffers of the memory comprises performing, for each buffer of the plurality of buffers, operations comprising:
assigning the unique buffer handle to the buffer;
allocating a page of the one or more pages included in the physical buffer space of the buffer to store data, with the allocated page corresponding to a respective page address of the plurality of page addresses within the physical memory space of the memory;
determining a page number of the allocated page, with the unique buffer handle of the buffer and the page number of the allocated page forming the respective access key for the buffer; and creating a respective entry in the mapping table for the allocated page of the buffer, with the respective entry associating the respective page address within the physical memory space of the memory to the respective access key for the buffer.

11. The method of claim 1,
wherein receiving the command to access the buffer comprises receiving a write command to write data into one or more blocks of one or more pages of the buffer of the plurality of buffers;
wherein determining the page address comprises determining whether the mapping table includes an entry associating the access key for the buffer indicated in the write command to the page address within the physical memory space of the memory; and
wherein performing the command comprises, responsive to a determination that the mapping table includes the entry for the access key, writing the data into the page address within the physical memory space of the memory.

12. The method of claim 1,
wherein receiving the command to access the buffer comprises receiving a write command to write data into one or more blocks of one or more pages of the buffer of the plurality of buffers;
wherein determining the page address comprises:
determining whether the mapping table includes an entry associating the access key for the buffer indicated in the write command to the page address within the physical memory space of the memory;
responsive to a determination that the mapping table includes no entry for the access key, performing operations comprising:
identifying the unique buffer handle of the buffer of the plurality of buffers for storing the data for the write command;
allocating a page of the one or more pages that are contiguous within the physical buffer space of the buffer to store the data, with the allocated page corresponding to a respective page address of the plurality of page addresses within the physical memory space of the memory;
determining the page number of the allocated page, with the unique buffer handle of the buffer and the page number of the allocated page forming the respective access key of the plurality of access keys for the buffer;
creating a respective entry in the mapping table for the allocated page of the buffer, with the respective entry associating the respective page address within the physical memory space of the memory to the respective access key for the buffer; and
wherein performing the command comprises writing the data into the page address within the physical memory space of the memory.

13. The method of claim 1, further comprising:
receiving a free page command to deallocate one or more pages of a buffer of the plurality of buffers;
determining whether a state of the buffer is valid;
responsive to a determination that the state of the buffer is valid, deallocating the buffer by performing operations comprising:
removing an entry in the mapping table associating an access key for the buffer indicated in the free page command to a page address within the physical memory space of the memory; and
incrementing a free page counter by a number of pages in the buffer.

14. The method of claim 1, further comprising:
receiving a free page command to deallocate one or more pages of a buffer of the plurality of buffers;
determining whether a state of the buffer is valid; and
responsive to a determination that the state of the buffer is other than valid, suspending execution of the free page command.

15. The method of claim 1,
wherein receiving the command to access the buffer comprises receiving a read command to read data from one or more blocks of one or more pages of the buffer of the plurality of buffers;
wherein determining the page address comprises:
determining whether a state of the buffer is valid, and
responsive to a determination that the state of the buffer is valid, determining that the mapping table includes an entry associating the access key for the buffer indicated in the read command to the page address within the physical memory space of the memory; and
wherein performing the command comprises reading the data from the page address within the physical memory space of the memory.

16. An apparatus of buffer allocation and memory management, comprising:
one or more processing cores;
a memory; and
a memory controller communicatively coupled to the processing cores and the memory to control access to the memory, the memory controller configured to perform operations comprising:
allocating a plurality of buffers of the memory with the buffers having variable sizes, wherein each of the buffers comprises one or more pages that are contiguous within a physical buffer space of the respective one of the buffers, wherein each of the pages comprises one or more blocks for data storage, and wherein the one or more pages within the physical buffer space correspond to one or more page addresses of a plurality of page addresses within a physical memory space of the memory;
maintaining a mapping table that includes one or more entries organized in a tree structure, wherein each of the entries associates one of a plurality of access keys for the buffers to a respective one of the plurality of page addresses within the physical memory space of the memory, wherein each of the plurality of access keys comprises a unique buffer handle that indicates a buffer of the plurality of buffers and a page number of one of the pages within the physical buffer space of the buffer;
receiving, by the memory controller and from a processing core, a command to access the buffer of the plurality of buffers, wherein the command includes the unique buffer handle that indicates the buffer and the page number of one of the pages within the physical buffer space of the buffer;
determining, by the memory controller and based on the mapping table, a page address within the physical memory space of the memory using an access key comprising the unique buffer handle and the page number included in the command; and
performing, by the memory controller, the command using the page address within the physical memory space of the memory.

17. The apparatus of claim 16, wherein, in maintaining the mapping table, the memory controller is configured to perform operations comprising:
- assigning the unique buffer handle to the buffer of the plurality of buffers; and
- creating a one-level tree structure, as the tree structure of the mapping table, to accommodate a single page within the physical buffer space of the buffer,
- wherein the unique buffer handle serves as a physical address of the single page within the physical buffer space of the buffer.

18. The apparatus of claim 17, wherein the memory controller is further configured to perform operations comprising:
- initializing the unique buffer handle of the buffer with configuration indicating whether the buffer is expandable,
- wherein, in an event that the buffer is non-expandable, the configuration further indicates a maximum size of the buffer.

19. The apparatus of claim 17, wherein the memory controller is further configured to perform operations comprising:
- expanding the one-level tree structure of the mapping table into a two-level tree structure to accommodate a first number of plural pages within the physical buffer space of the buffer,
- wherein the expanding of the one-level tree structure into the two-level tree structure comprises:
  - creating a multi-page pointer at a top level of the tree structure to reference one or more single-page pointers at a bottom level of the tree structure; and
  - creating the one or more single-page pointers at the bottom level of the tree structure with each of the one or more single-page pointers referencing a respective page within the physical buffer space of the buffer.

20. The apparatus of claim 19, wherein the memory controller is further configured to perform operations comprising:
- expanding the two-level tree structure of the mapping table into a multi-level tree structure to accommodate a second number of plural pages within the physical buffer space of the buffer,
- wherein the second number is greater than the first number,
- wherein the multi-page pointer comprises a first multi-page pointer, and
- wherein the expanding of the two-level tree structure into the multi-level tree structure comprises:
  - creating a second multi-page pointer at the top level of the tree structure to reference one or more first multi-page pointers at a middle level of the tree structure;
  - creating the one or more first multi-page pointers at the middle level of the tree structure with each of the one or more first multi-page pointers referencing one or more single pointers of a plurality of single-page pointers at the bottom level of the tree structure; and
  - creating the plurality of single-page pointers at the bottom level of the tree structure with each of the plurality of single-page pointers referencing a respective page within the physical buffer space of the buffer.

21. The apparatus of claim 16, wherein, in maintaining the mapping table, the memory controller is configured to perform operations comprising:
- assigning the unique buffer handle to the buffer of the plurality of buffers; and
- creating a two-level tree structure, as the tree structure of the mapping table, to accommodate a first number of plural pages within the physical buffer space of the buffer,
- wherein the unique buffer handle serves as a physical address of a first page of the plural pages within the physical buffer space of the buffer, and
- wherein the creating of the two-level tree structure comprises:
  - creating a multi-page pointer at a top level of the tree structure to reference one or more single-page pointers at a bottom level of the tree structure; and
  - creating the one or more single-page pointers at the bottom level of the tree structure with each of the one or more single-page pointers referencing a respective page within the physical buffer space of the buffer.

22. The apparatus of claim 21, wherein the memory controller is further configured to perform operations comprising:
- expanding the two-level tree structure of the mapping table into a multi-level tree structure to accommodate a second number of plural pages within the physical buffer space of the buffer,
- wherein the second number is greater than the first number,
- wherein the multi-page pointer comprises a first multi-page pointer, and
- wherein the expanding of the two-level tree structure into the multi-level tree structure comprises:
  - creating a second multi-page pointer at the top level of the tree structure to reference one or more first multi-page pointers at a middle level of the tree structure;
  - creating the one or more first multi-page pointers at the middle level of the tree structure with each of the first one or more multi-page pointers referencing one or more single pointers of a plurality of single-page pointers at the bottom level of the tree structure; and
  - creating the plurality of single-page pointers at the bottom level of the tree structure with each of the plurality of single-page pointers referencing a respective page within the physical buffer space of the buffer.

\* \* \* \* \*